(12) United States Patent
Krause

(10) Patent No.: US 12,359,770 B2
(45) Date of Patent: Jul. 15, 2025

(54) BRACKET ASSEMBLING METHOD AND SYSTEM FOR ASSEMBLING A BRACKET

(71) Applicant: Advanced Architectural Products, LLC, Allegan, MI (US)

(72) Inventor: G. Matt Krause, Allegan, MI (US)

(73) Assignee: Advanced Architectural Products, LLC, Allegan, MI (US)

( * ) Notice: Subject to any disclaimer, the term of this patent is extended or adjusted under 35 U.S.C. 154(b) by 54 days.

(21) Appl. No.: 18/518,140

(22) Filed: Nov. 22, 2023

(65) Prior Publication Data

US 2024/0167620 A1     May 23, 2024

Related U.S. Application Data

(60) Provisional application No. 63/427,308, filed on Nov. 22, 2022.

(51) Int. Cl.
    *F16M 13/02*      (2006.01)
    *F16B 3/00*      (2006.01)

(52) U.S. Cl.
    CPC .............. *F16M 13/02* (2013.01); *F16B 3/00* (2013.01)

(58) Field of Classification Search
    CPC .................................. F16M 13/02; F16B 3/00
    See application file for complete search history.

(56) References Cited

U.S. PATENT DOCUMENTS

| | | | |
|---|---|---|---|
| 8,826,620 B2 | 9/2014 | Krause | |
| 8,833,025 B2 | 9/2014 | Krause | |
| 9,151,052 B2 | 10/2015 | Krause | |
| 10,221,574 B2 * | 3/2019 | Krause | .................... E04B 1/388 |
| 11,396,757 B2 * | 7/2022 | Krause | .................... E04B 1/7654 |
| 2017/0356181 A1 * | 12/2017 | Krause | .................... E04B 1/388 |
| 2023/0134969 A1 * | 5/2023 | Krause | ................ E04F 13/0817 |
| | | | 52/309.2 |

FOREIGN PATENT DOCUMENTS

DE      202008004377 U1     6/2008

* cited by examiner

*Primary Examiner* — Eret C McNichols
(74) *Attorney, Agent, or Firm* — The Watson IP Group, PLC; Jovan N. Jovanovic

(57) ABSTRACT

A system for assembling a bracket assembly comprising a base, a coupling guide block, at least one bracket support block and at least one backer guide block. The coupling guide block is coupled to the base and includes a bracket receiving bore on one side and at least one backer receiving bore on an opposite side. The at least one bracket support bracket is coupled to the base and spaced apart from a first side of the coupling guide block. The at least one backer guide block is coupled to the base and spaced apart from a second side of the coupling guide block. Methods are likewise disclosed.

20 Claims, 25 Drawing Sheets

BRACKET ASSEMBLING METHOD AND SYSTEM FOR ASSEMBLING A BRACKET

CROSS-REFERENCE TO RELATED APPLICATION

This application claims priority from U.S. Prov. Patent App. Ser. No. 63/427,308 entitled "Bracket Assembling Method And System For Assembling a Bracket" filed Nov. 22, 2022, the entire disclosure of which is hereby incorporated by reference in its entirety.

BACKGROUND OF THE DISCLOSURE

1. Field of the Disclosure

The disclosure relates in general to building products and the assembly of building products, and more particularly, to a bracket assembly method and a system for assembling a bracket. While not limited thereto, the system is well suited for use in the assembly of bracket assemblies (i.e., girts) that are formed with a fiber reinforced polymer and include backers that are coupled thereto (i.e., slidably attachable)

2. Background Art

The use of polymer based brackets is known in the building products. Among other products, the brackets sold under the mark the SmartCI by Advanced Architectural Products, of Allegan, Michigan, are known in the art. Such bracket assemblies include a fiber reinforced polymer bracket with one or more slidably attachable backer members. Typically, the backer members are formed from a steel or stainless steel material and are slidably coupled to the bracket.

It is desirable to improve the slidable coupling of the backer member with the bracket so as to improve the assembly thereof.

SUMMARY OF THE DISCLOSURE

The disclosure is directed in a first aspect to a coupling guide block attachable to a base. The coupling guide block comprises a body, a bracket receiving bore and a backer receiving bore. The body has a first end and a second end. The bracket receiving bore has an entry region at the first end of the body and extending toward the second end of the body. The bracket receiving bore is structurally configured to receive an end of a bracket member therewithin. The backer receiving bore has an entry region at the second end of the body and extending toward the first end of the body. The backer receiving bore meets the bracket receiving bore between the first end and the second end of the body at a mating region. The backer receiving bore has at least one backer bore region configured to receive an end of a backer that is slidably attachable to the bracket member. The maintaining of the bracket within the bracket receiving bore while inserting the backer into the backer receiving bore directs the bracket into slidable engagement with the bracket member.

In some configurations, the backer receiving bore includes a first backer bore region and a second backer bore region that is spaced apart from the first backer bore region. The first backer bore region is structurally configured to receive a first backer therewithin for slidable coupling with the bracket. The second backer bore region structurally configured to receive a second backer therewithin for slidable coupling with the bracket.

In some configurations, the mating region includes a bracket stop wall corresponding to the bracket receiving bore and an insert opening corresponding to the backer receiving bore. The bracket stop wall precludes further insertion of the bracket into the body of the coupling guide block. The insert opening is configured to align with a portion of the bracket structurally configured to receive the backer.

In some configurations, the first end and the second end are substantially parallel to each other.

In some configurations, the coupling guide block further includes a first flange extending from a first side of the body and a second flange extending from a second side of the body. The first and second flanges positioned proximate a base of the body so as to overly the base.

In some configurations, each of the first flange and the second flange include a plurality of openings, structurally configured to receive a fastener therethrough.

In some configurations, the first flange and the second flange span between the first end and the second end of the body and are substantially perpendicular to each of the first end and the second end.

In some configurations, the backer receiving bore includes an entry region that inwardly tapers to a transition region that further inwardly tapers to an end region.

In some configurations, at the end region of the coupling guide block, the backer receiving bore includes a central channel having an upper transverse channel and a lower transverse channel opposite the upper transverse channel, the upper and lower transverse channels being substantially perpendicular to the central channel therebetween.

In another aspect of the disclosure, the disclosure is directed to a system for assembling a bracket comprising the above and hereinafter described coupling guide block, at least one bracket support block and at least one backer guide block. The at least one bracket support block is positioned in a spaced apart orientation from the first end of the coupling guide block. Each of the at least one bracket support blocks comprising a body with an upper surface defining a profile. The profile substantially corresponding to at least a portion of the bracket positionable thereon. The profile aligning with the bracket receiving bore of the coupling guide block. The at least one backer guide block positioned in a spaced apart orientation from the second end of the coupling guide block. Each of the at least one backer guide block comprising a body having at least one insert guide member defining a channel to receive the backer member therealong. The channel aligning with the backer receiving bore of the coupling guide block.

In some configurations, the at least one insert guide member comprises a first insert guide member and a second insert guide member. The backer receiving bore includes a first backer bore region and a second backer bore region. The first insert guide member defines a first channel that is aligned with the first backer bore region and the second insert guide member defines a second channel that is aligned with the second backer bore region.

In some configurations, the at least one bracket support block comprises at least three backer bore support blocks positioned in an aligned and spaced apart orientation.

In some configurations, the at least one backer guide block comprises at least three backer guide blocks positioned in an aligned and spaced apart orientation.

In some configurations, the backer is one of manually directed and directed through automation along the at least one backer support block and through the coupling guide block into the slidable engagement with the bracket.

In some configurations, the at least one channel of the backer guide block is configured in one of a "U" shaped configuration and a "C" shaped configuration.

In yet another aspect of the disclosure, the disclosure is directed to a method of assembling a bracket with a backer comprising the steps of: providing a system set forth herein above or herein below; providing a bracket member; providing a backer member; placing the bracket member on the at least one bracket support block; slidably directing the bracket member into the bracket receiving bore of the coupling guide block; placing the backer member in the at least one channel of the at least one backer block; slidably directing the backer member into the backer receiving bore of the coupling guide block; and continuing to slide the backer member through the receiving bore and into slidable engagement with the bracket, while maintaining the bracket within the bracket receiving bore.

In some configurations, the step of slidably directing the bracket member further comprises the step of slidably directing the bracket member until the bracket member reaches the mating region.

In some configurations, the method further comprises the steps of: providing a second backer member; placing the backer member in a second channel of the at least one backer block; slidably directing the second backer member into a second backer receiving bore region of the coupling guide block; and continuing to slide the second backer member through the second backer receiving bore region of the coupling guide block and into slidable engagement with the bracket, while maintaining the bracket within the bracket receiving bore.

In some configurations, the step of continuing to slide the backer member and the step of continuing to slide the second bracket member occur simultaneously.

In some configurations the step of continuing to slide can occur manually or through automation. In yet another aspect of the disclosure, the disclosure is directed to a method of assembling the system of claim 10 comprising the steps of: attaching the coupling guide block to a base; positioning the at least one bracket support block in alignment with the bracket receiving bore of the coupling guide block; attaching the at least one bracket support block to the base; positioning the at least one backer guide block in alignment with the backer receiving bore of the coupling guide block; and attaching the at least one backer guide block to the base.

In some configurations, the at least one bracket support block comprises at least three bracket support blocks. The step of positioning the at least one bracket support block comprise the step of positioning each of the at least three bracket support blocks. The step of attaching the at least one bracket support block comprises the step of attaching each of the at least three bracket support blocks.

In some configurations, the at least one backer guide block comprises at least three backer guide blocks. The step of positioning the at least one backer guide block comprises the step of positioning each of the at least three backer guide blocks. The step of attaching the at least one backer guide block comprises the step of attaching each of the at least three backer guide blocks.

BRIEF DESCRIPTION OF THE DRAWINGS

The disclosure will now be described with reference to the drawings wherein.

DETAILED DESCRIPTION OF THE DISCLOSURE

Figure 1:
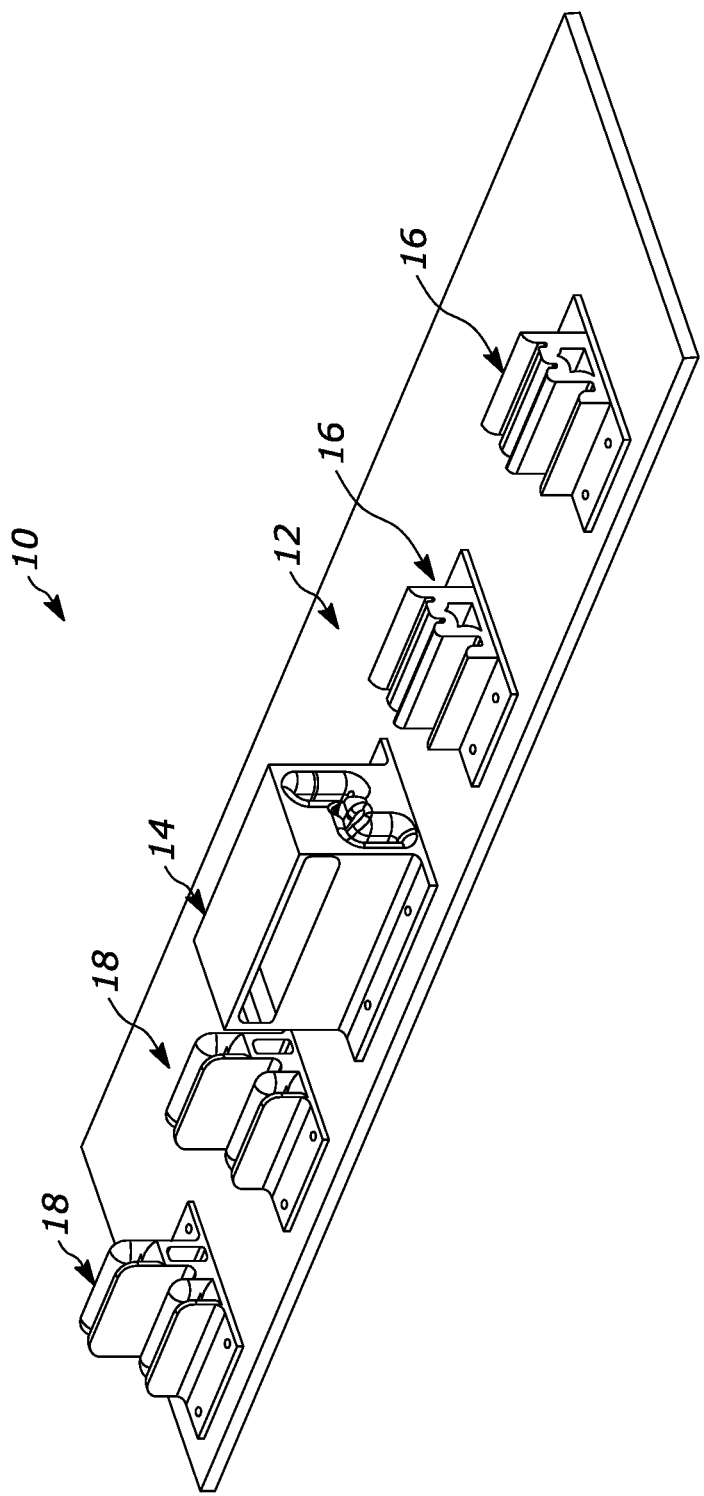
FIG. 1 of the drawings is a perspective view of the system of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the system for assembling a bracket is shown generally at 10. The system is configured for assembling a fiber reinforced polymer bracket with a reinforcement backer (known in the industry as a "girt"). Some such brackets are disclosed in any one of U.S. Pat. Nos. 8,826,620; 8,833,025; 9,151,052, as well as U.S. patent application Ser. No. 17/977,811, each of which are issued and or invented by G. Matt Krause, and each of which is hereby incorporated by reference in its entirety.

The Bracket Member Configuration

A configuration of a girt, as taken from the '811 application, includes a fiber reinforced polymer bracket member 314 which cooperates with backers (i.e., rigidity members 316), forming the bracket assembly or girt. The bracket member itself comprises a polymer member, or a composite member that includes body wall 202, first end wall 204 and second end wall 206. In the embodiment shown, the first end wall 204 is generally perpendicular to the body wall 202 and the end wall 206 is likewise perpendicular to the body wall 202. It is contemplated that the bracket comprises an elongated member which is of a generally uniform cross-sectional shape, with variations that may be positioned along the length thereof.

Typically, such bracket members may be provided in any number of standard sizes that may be from only a couple of feet long to spans that are forty to fifty feet long. It is most preferred that the bracket members comprise a pulltruded profile that includes fibers, preferably, both stranded fiber members and woven fiber members, within a resin matrix. It will be understood that the shape can be formed through one or more pulltrusion dies to achieve the final desired configuration. It is contemplated that a single resin system may be utilized, or that multiple resin systems may be utilized. Of course, the particular configuration and application may dictate changes to the relative thicknesses and dimensions of the different components. Among other fibers, it is contemplated that the fibers may comprise glass fibers (fiberglass), carbon fibers, cellulose fibers, nylon fibers, aramid fibers, and other such reinforcing fibers.

The bracket members provide a thermal break. As used herein, the term "thermal break" refers to a break in like materials wherein the material disposed between like materials is comprised of a material having low thermal conductivity such as a polymeric material having a high R-value as further described below. R-values are measurements of the thermal resistance of different materials. R-values are well known by those skilled in the art of the construction and insulation industries. A high R-value indicates a highly insulative material, such as an R-value of R.2 per inch and higher. Conductive materials have a very low R-value, such as steel which exhibits a negligible or nearly non-existent R-value. In the configuration of the present disclosure, there are no like materials in contact with one another, nor is there any metal to metal contact creating a pathway for heat to transfer from the exterior to the interior and vice versa.

It is also contemplated that the bracket members may comprise anticorrosive polymeric materials that exhibit high insulative qualities or rather, demonstrate high R-value properties such as an R-value in the range of about R.2 to about R8 per inch. Polymeric materials suitable for the present disclosure include thermoplastics or thermoset resin materials including for example: acrylonitrile-butadiene-styrene (ABS) copolymers, vinylesters epoxies, phenolic resins, polyvinyl chlorides (PVC), polyesters, polyurethanes, polyphenylsufone resin, polyarylsulfones, polyphthalimide, polyamides, aliphatic polyketones, acrylics, polyxylenes, polypropylenes, polycarbonates, polyphthalamides, polystyrenes, polyphenylsulfones, polyethersulfones, polyfluorocarbons, bio-resins and blends thereof. Other such thermoplastics and thermoplastic resins suitable for the present disclosure are known in the art which demonstrate high R-values and are thereby heat resistant as well as anticorrosive. Thermoplastics of the present disclosure are also contemplated using a recyclable polymer or are made of a polymeric material which is partially comprised of a renewable resource such as vegetable oil or the like in its composition when an eco-friendly or "green" bracket member is desired. The polymeric material of the present disclosure can also be reinforced with a reinforcing fiber as detailed below. Bracket members composed of the materials discussed above form a thermal break between exterior panels and building substrates in an effort to control the temperature within a building structure by reducing or eliminating thermal conductivity from the exterior panel to the building substrate and vice versa. In assembly, the R-value of an exterior wall panel system of the present disclosure can typically exhibit a R-value from about R.2 to about R30 per inch depending on the thickness of the overall system, the insulation materials used and the composition of the bracket members. Further, microspheres, such as polymeric or glass nanospheres, can be added to the makeup of the brackets to provide further insulative properties and increased R-value expression.

There are several different types of measurements that relate to a materials ability to insulate, resist, transmit or conduct heat across a material. Particularly, a material's K-value relates to a specific material's thermal conductivity, a material's C-value correlates to the material's thermal conductance, a material's R-value relates to a material's thermal resistance, and a U-value relates to the thermal transmittance of an overall system. In designing a wall, roof or deck bracket and panel system providing adequate insulative properties for a building structure, materials with low K-values and C-values are desired while materials with high R-values are desired. When this set of conditions is met, the overall thermal transmittance, or U-value, of the system is low. Thus, the lower the U-value, the lower the rate heat thermally bridges from one material to another. A building structure having a well insulated system will have a much lower U-value than an uninsulated or poorly insulated system exhibiting high thermal transmittance.

Regarding the R-value of the bracket members of the present disclosure, a relatively high R-value is desired to ensure adequate insulation of a building structure from outside elements by making a bracket that creates a thermal break in a wall panel system. A range of R-values for the polymeric materials used to construct the bracket members described above would be a range of about R.2 to about R8 per inch in order to create a thermal break that effectively reduces or eliminates thermal bridging. The thermal conductivity, or K-value, is the reciprocal of the material's R-value, such that for a polymeric material exhibiting an R-value of about R.2 to R8 per inch, the correlating K-value for that material would be from about K5 to about K0.125 per inch. Thus, in comparison to present day metal brackets used in other bracket and panel systems made of iron or steel, a polymeric bracket member of the present disclosure will exhibit a K-value of approximately about K.5 to about K0.125 per inch at a given set of conditions as compared to a bracket made from a metallic material such as iron or steel which would have an approximate K-value as high as K32 to K60 per inch at the same conditions. This is because metallic materials, such as iron and steel, have low or negligible R-values and are well known conductors of heat. Steel is known to have an R-value of about 0.003R per inch. Thus, for example, a steel bracket compared to a polymeric bracket of the present disclosure having an R-value of R.55 would be 183 times more thermally conductive. Some such bracket configurations are sold by the Applicant of the present disclosure under the mark GREEN GIRT, and such configurations are hereby incorporated by reference.

The body wall 202 includes top surface 210 and bottom surface 212 which extend from first end 214 to second end 216, upper rib 218 and lower rib 220. The upper rib extends outwardly from the top surface 210 between the first and second ends, bisecting the top surface into a top first end portion 222 and a top second end portion 224. The upper rib 218 preferably extends substantially perpendicularly to the top surface 210, and, includes first side 236, second side 238 and tip region 240 spanning therebetween. The first side 236 and the second side 238 are generally parallel to each other for at least a portion of the length.

The lower rib 220 preferably extends substantially perpendicularly to the bottom surface 212 of the body wall 202, and, includes first side 230, second side 232 and tip region 234. The lower rib 220 is preferably positioned on the opposite side of the upper rib 218, and has the same dimensions as the upper rib. As with the upper rib, the lower rib bisects the bottom surface 212 into a bottom first end portion 226 and a bottom second end portion 228.

The first end wall 204 is positioned at the first end of the body wall 202 and, as set forth above, is oblique to, or, more preferably perpendicular to, the body wall 202. In the embodiment shown, the first end wall extends downwardly from the bottom surface 212, and projects downwardly beyond the bottom surface 212 to define a lower flange portion 262. The first end wall 204 includes inside surface 250, outside surface 252, and extends from lower end 254 to upper end 256. The upper end 256 includes lower flange portion 262.

The lower flange portion 262 at a lower end on the outside surface 252 thereof includes a capillary break 260 (in the form of a relief portion which tapers toward the upper edge). As set forth in the incorporated references, the capillary breaks the water tension between it and the cladding or building substrate with which it is in contact so as to act as anti-capillary action grooves for water trapped therebetween or drawn into the joints.

A first reinforcement channel 258 is defined on one of the inside surface and the outside surface of the first end wall, and preferably on the inside surface thereof. The first reinforcement channel 258 includes upper clip portion 264 and lower clip portion 266 spanned on one side by surface 268 and open to the other side defining slot 269. The channel is generally parallel to the outside surface 252 and generally extends the entirety of the inside surface 250 below the bottom surface 212 of the body wall 202.

As will be explained below, first end wall strip 302 is slidably introduced into the first reinforcement channel 258. In certain embodiments, the first end wall strip 302 is relatively snug within the first reinforcement channel 258.

It will further be understood that a guide notch 267 extends on the outside surface 252 and along the length thereof. The guide notch 267 is provided so as to provide a user with a tactile feel for where to begin the insertion of a fastener. By initiating a fastener at the guide notch, it is such that the fastener will be directed into contact at an appropriate portion of the first end wall strip 302 positioned within the first reinforcement channel 258.

Figure 2:
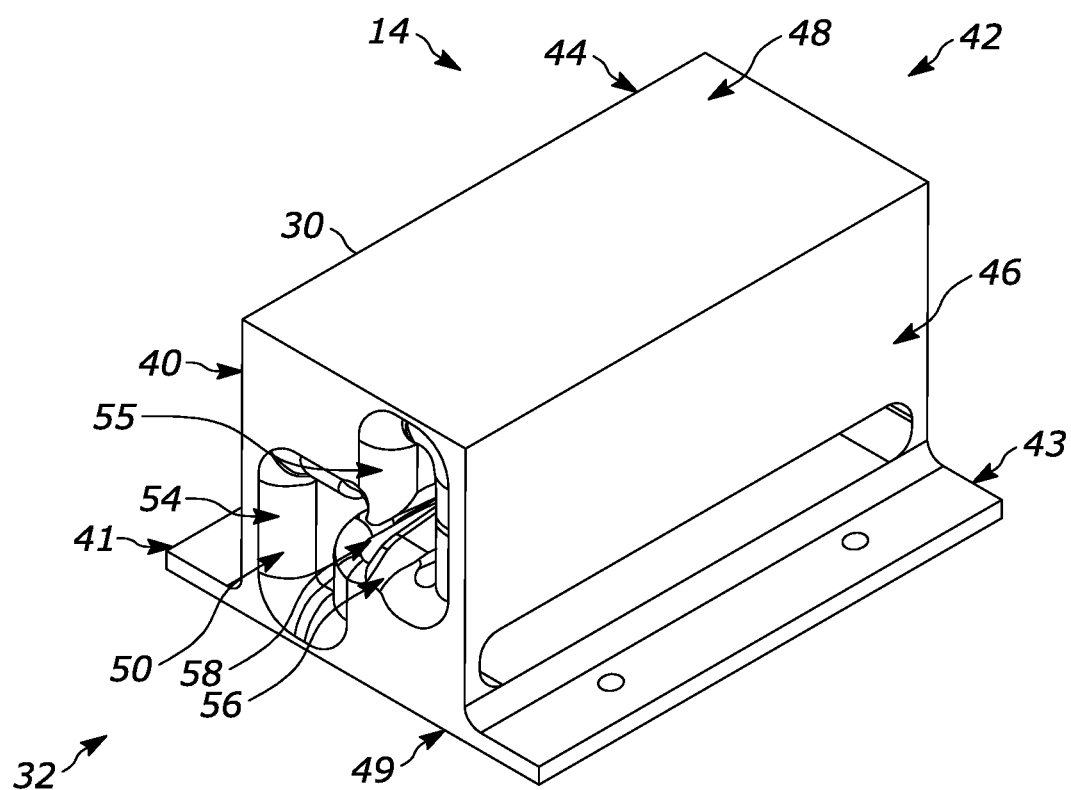
FIG. 2 of the drawings is a perspective view of the coupling guide block of the system of the present disclosure.
Figure 3:
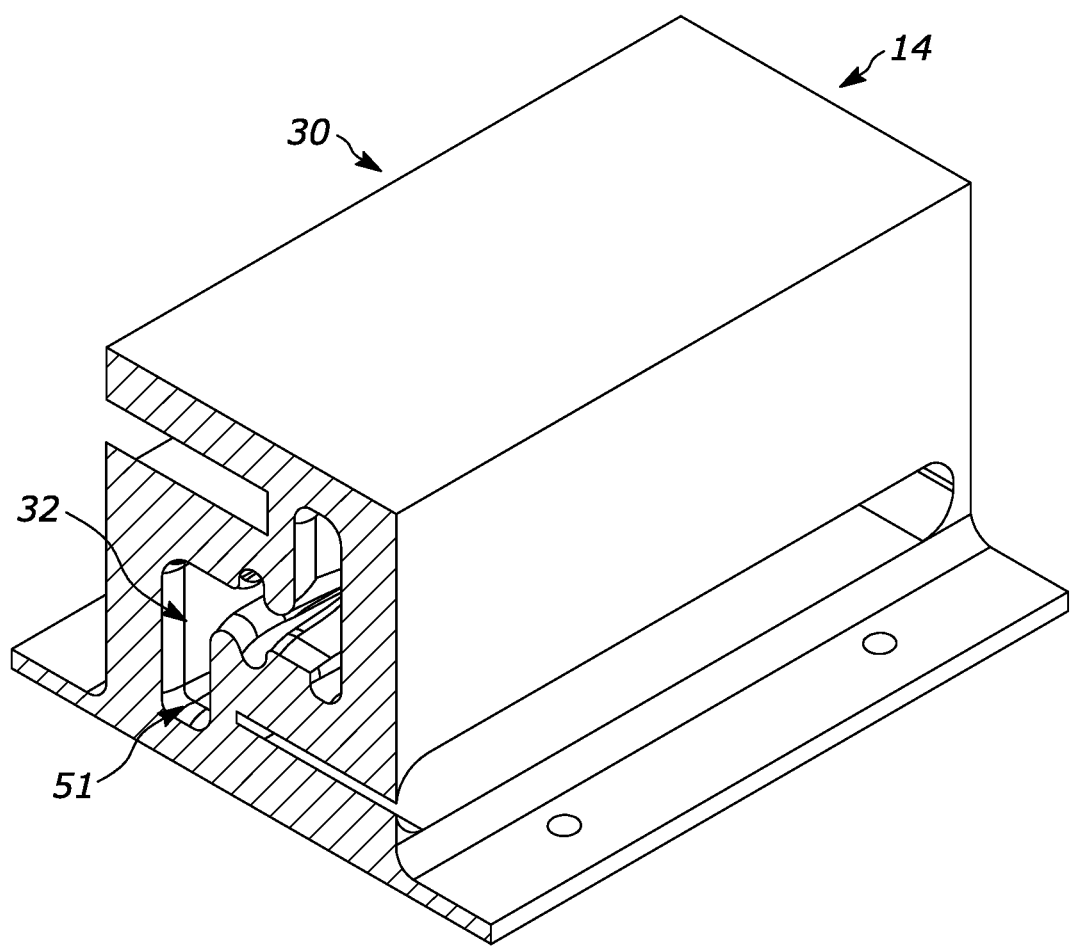
FIG. 3 of the drawings is a perspective cross-sectional view of the coupling guide block of the system of the present disclosure.
Figure 4:
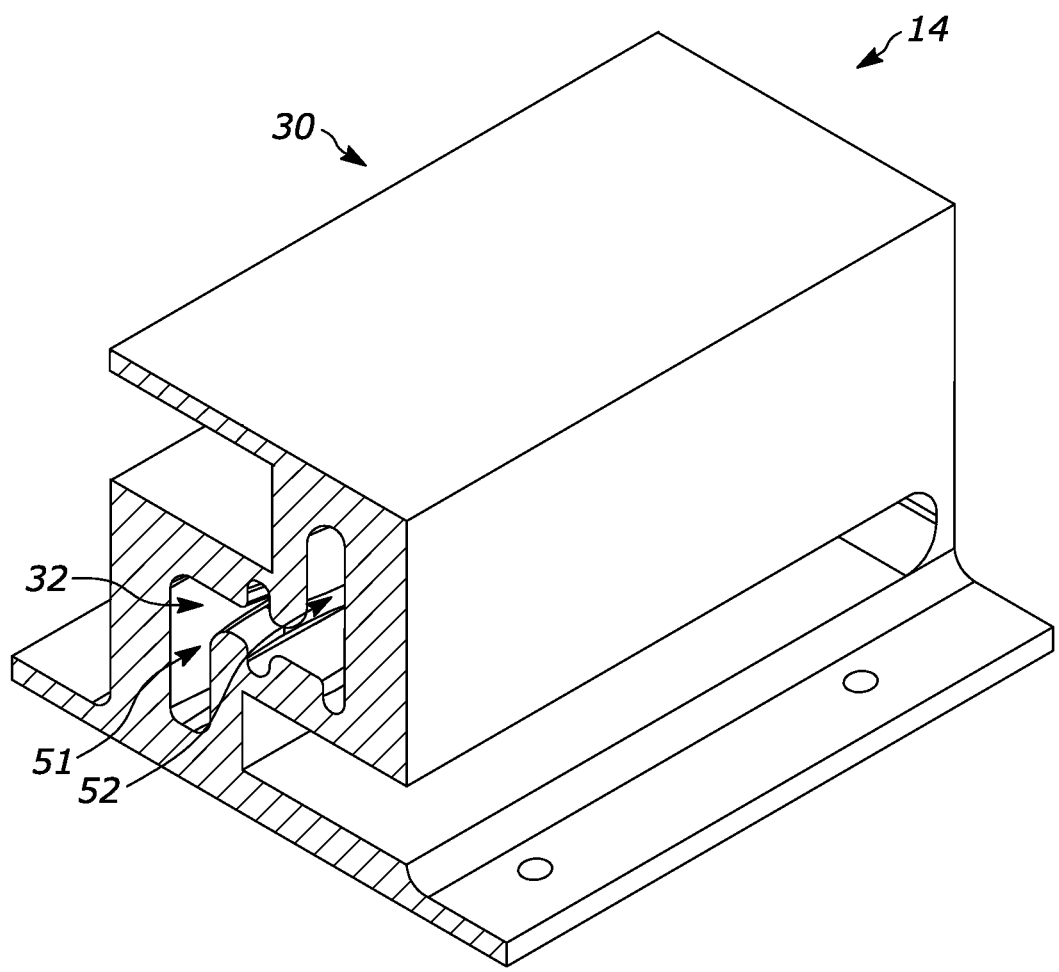
FIG. 4 of the drawings is a perspective cross-sectional view of the coupling guide block of the system of the present disclosure.
Figure 5:
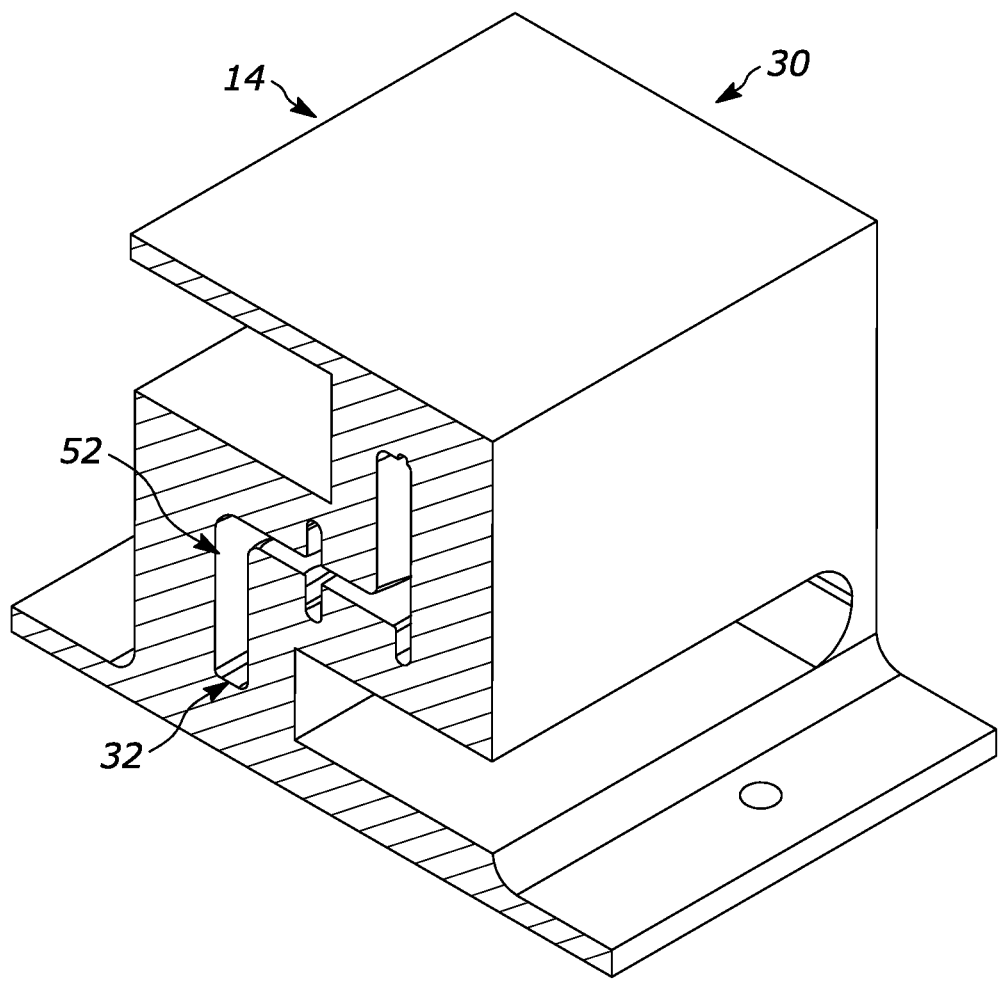
FIG. 5 of the drawings is a perspective cross-sectional view of the coupling guide block of the system of the present disclosure.
Figure 6:
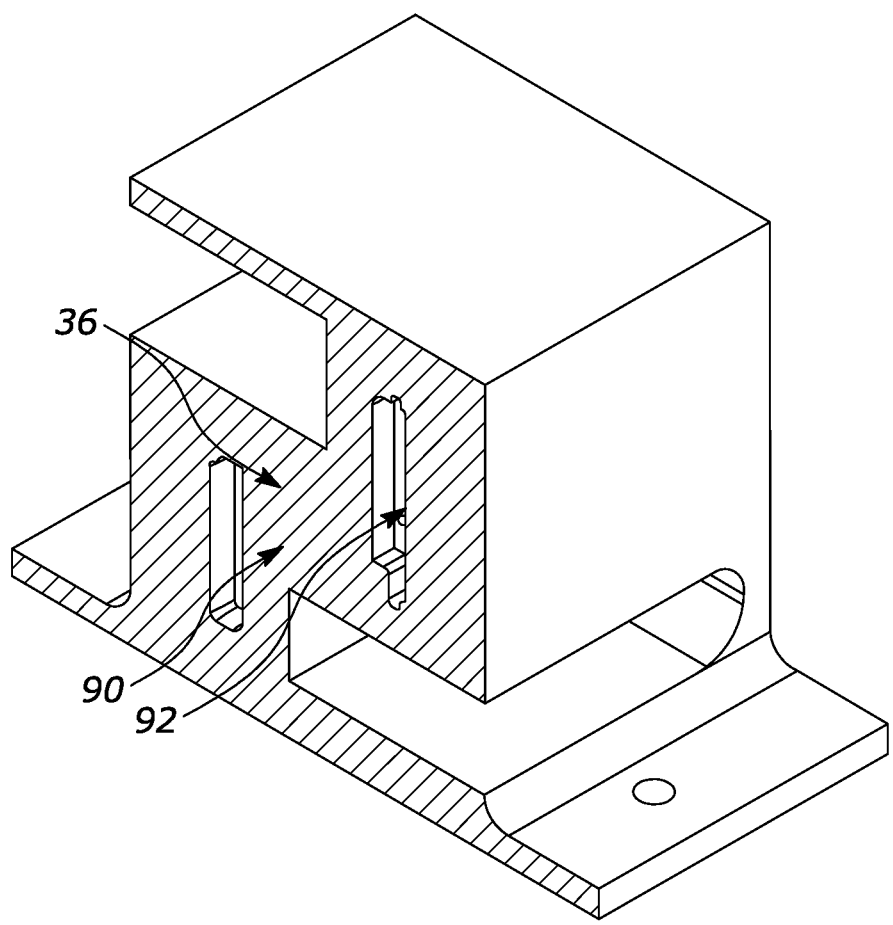
FIG. 6 of the drawings is a perspective cross-sectional view of the coupling guide block of the system of the present disclosure.
Figure 7:
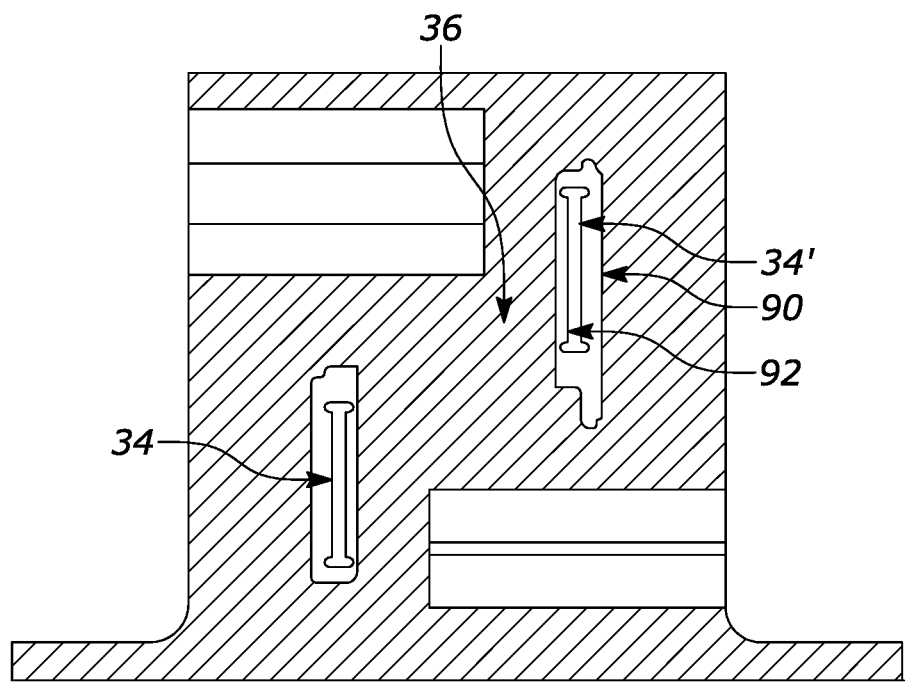
FIG. 7 of the drawings is a cross-sectional view of the coupling guide block of the system of the present disclosure.
Figure 8:
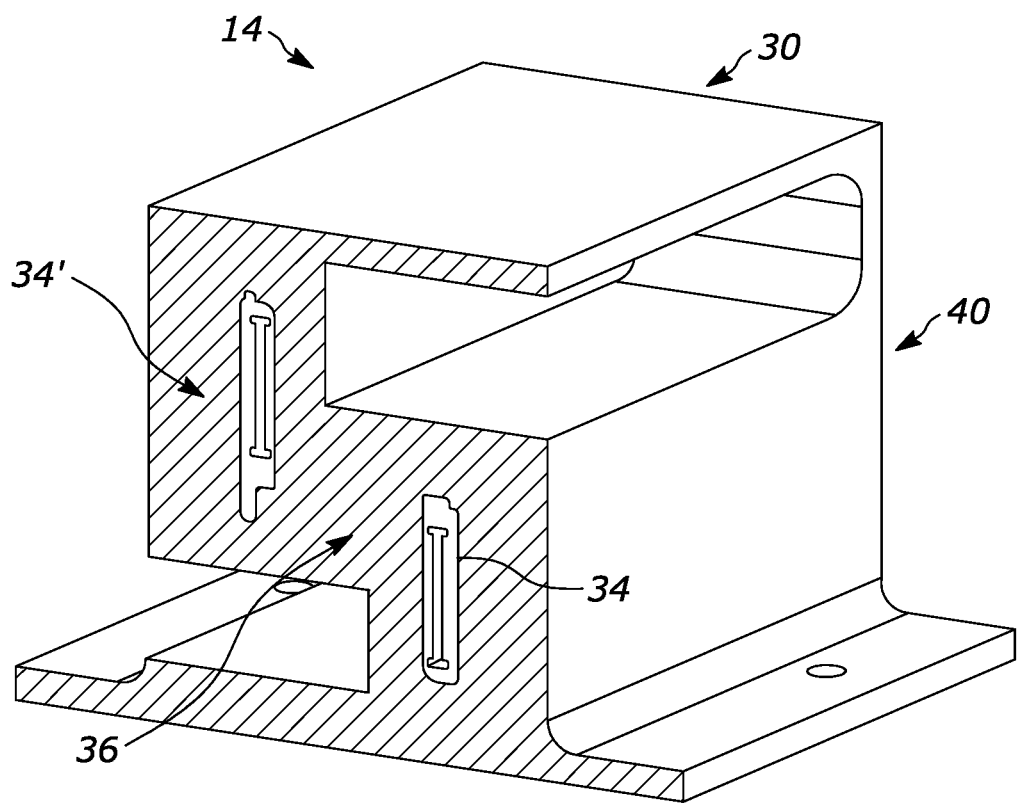
FIG. 8 of the drawings is a perspective cross-sectional view of the coupling guide block of the system of the present disclosure.
Figure 9:
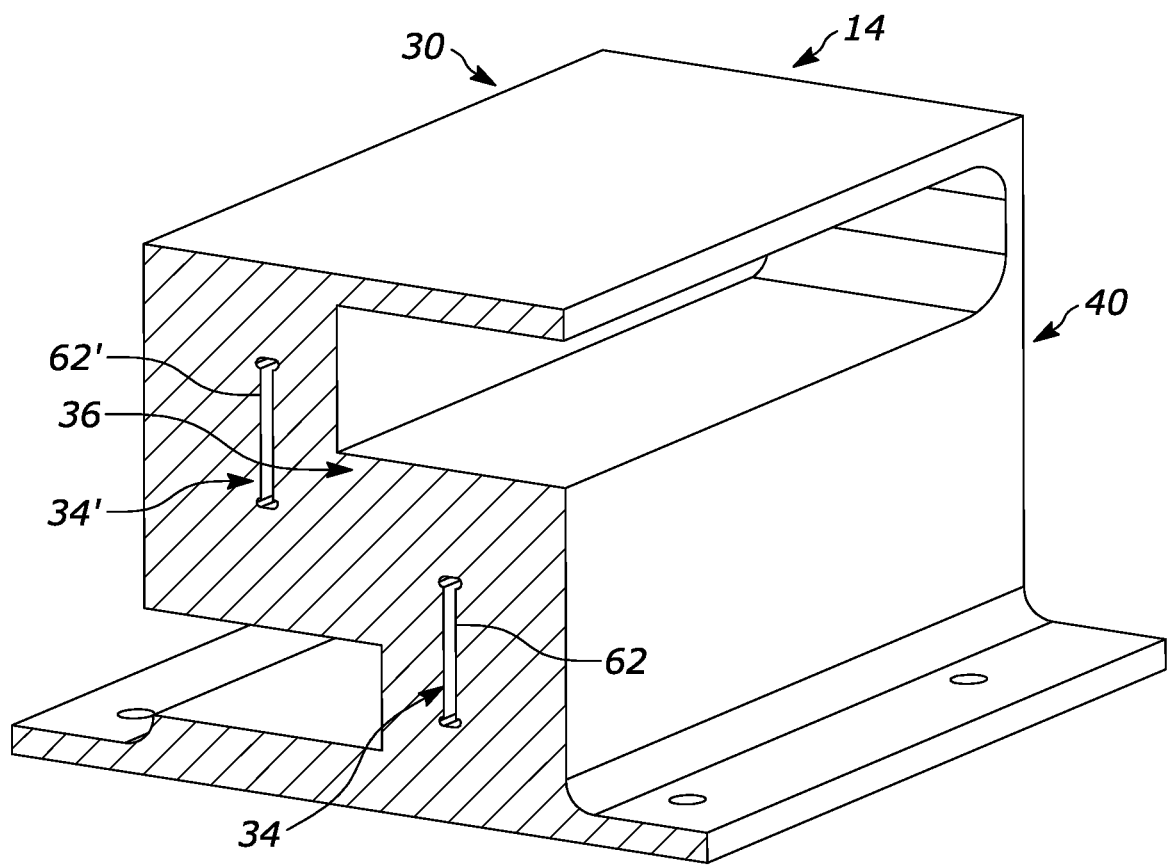
FIG. 9 of the drawings is a perspective cross-sectional view of the coupling guide block of the system of the present disclosure.
Figure 10:
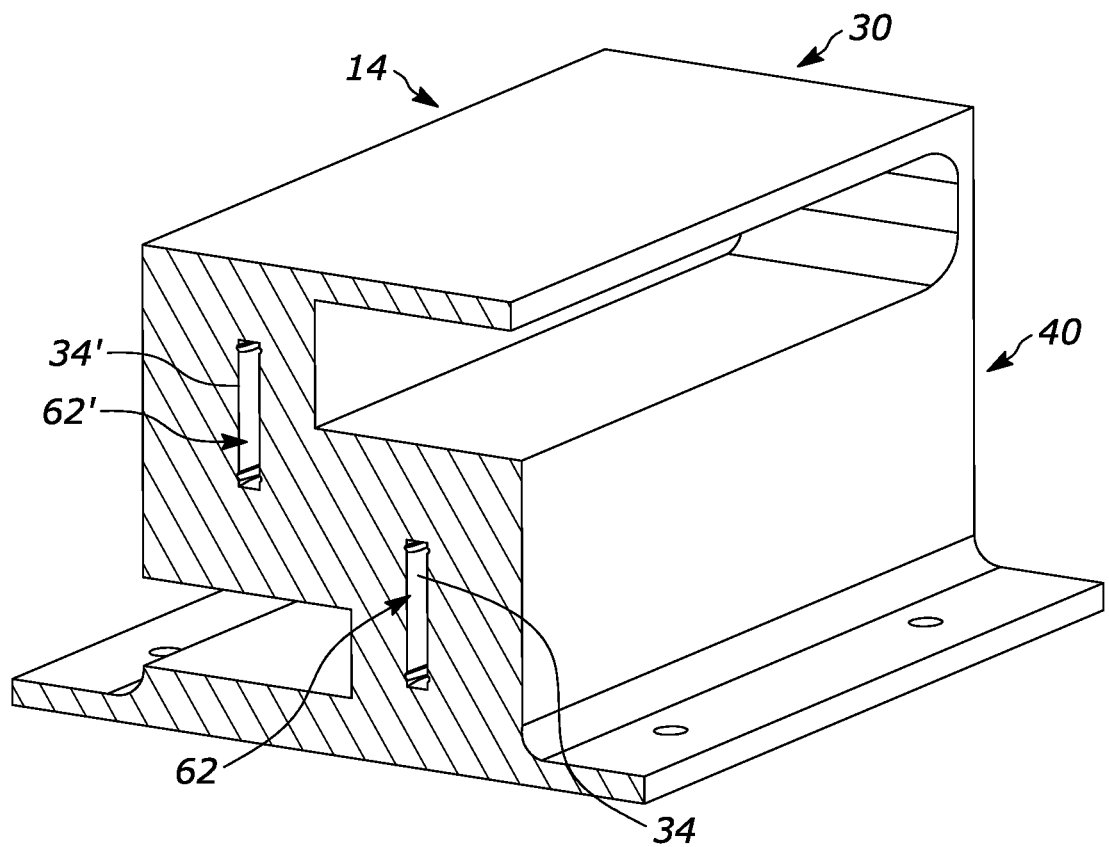
FIG. 10 of the drawings is a perspective cross-sectional view of the coupling guide block of the system of the present disclosure.
Figure 11:
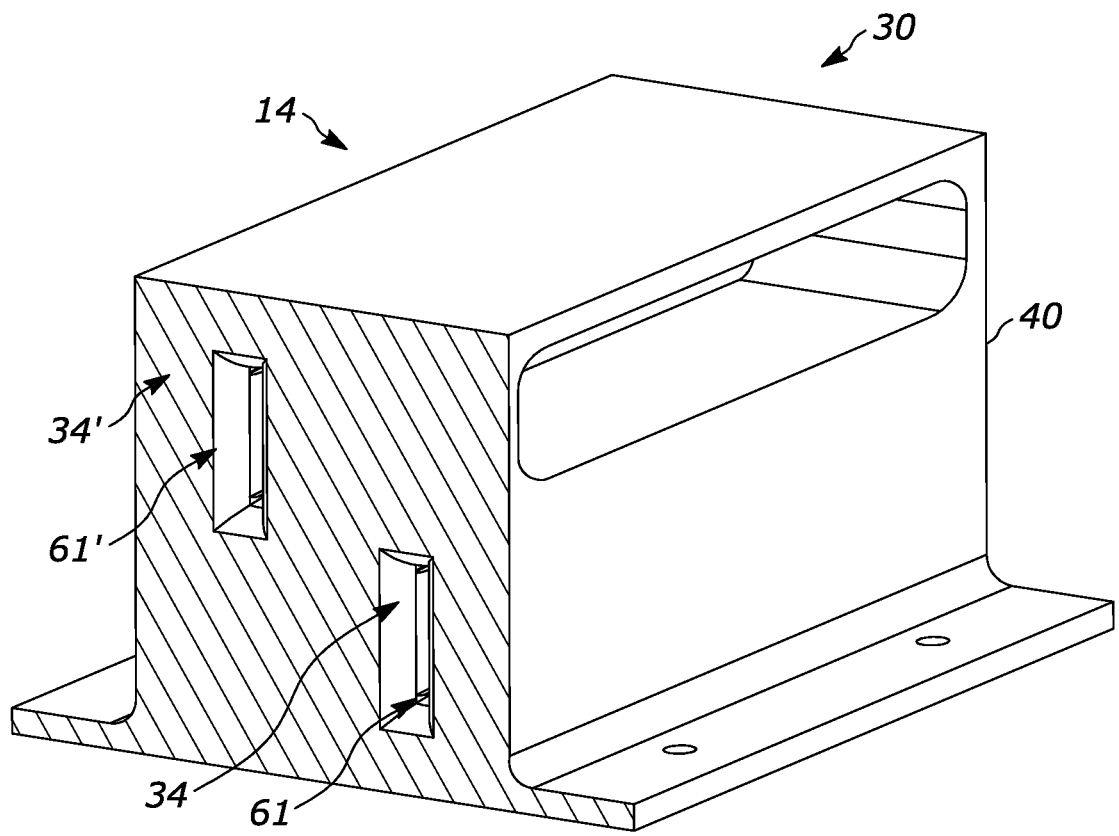
FIG. 11 of the drawings is a perspective cross-sectional view of the coupling guide block of the system of the present disclosure.
Figure 12:
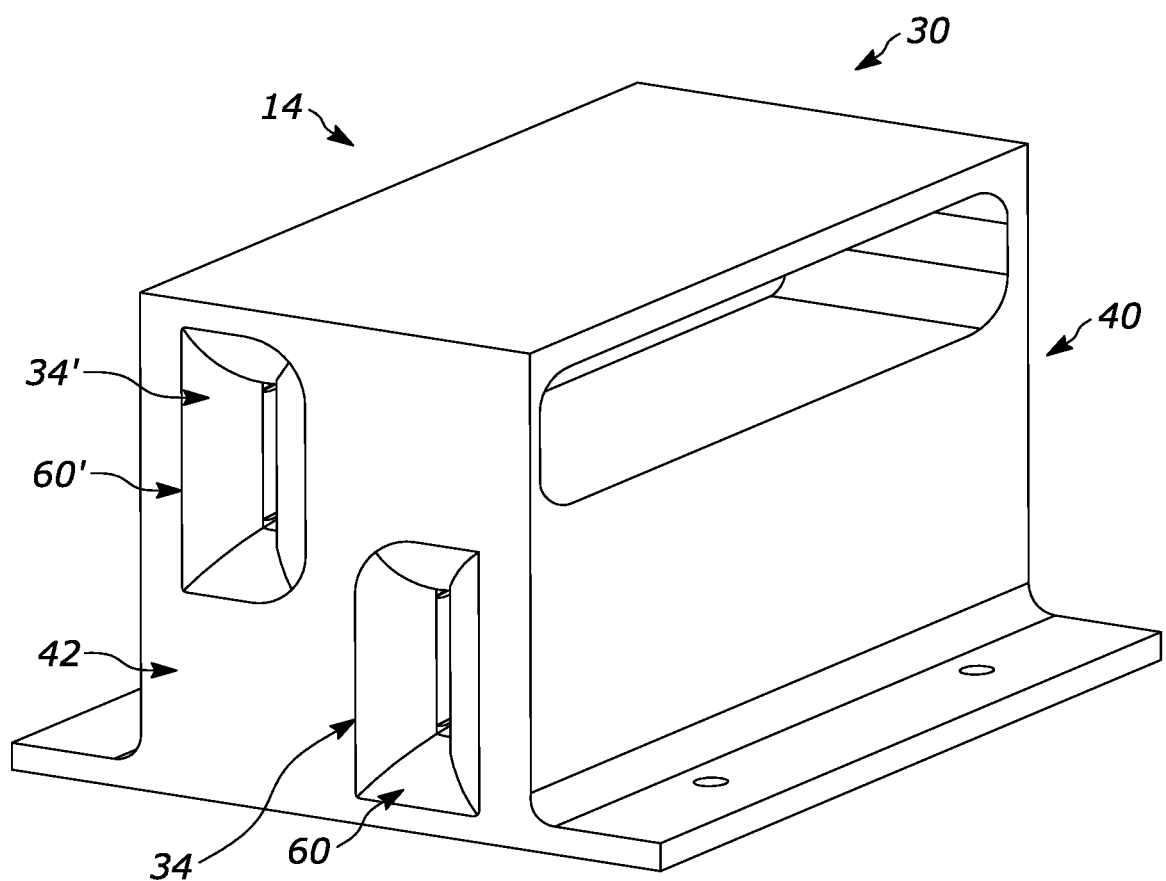
FIG. 12 of the drawings is a perspective view of the coupling guide block of the system of the present disclosure.
Figure 13:
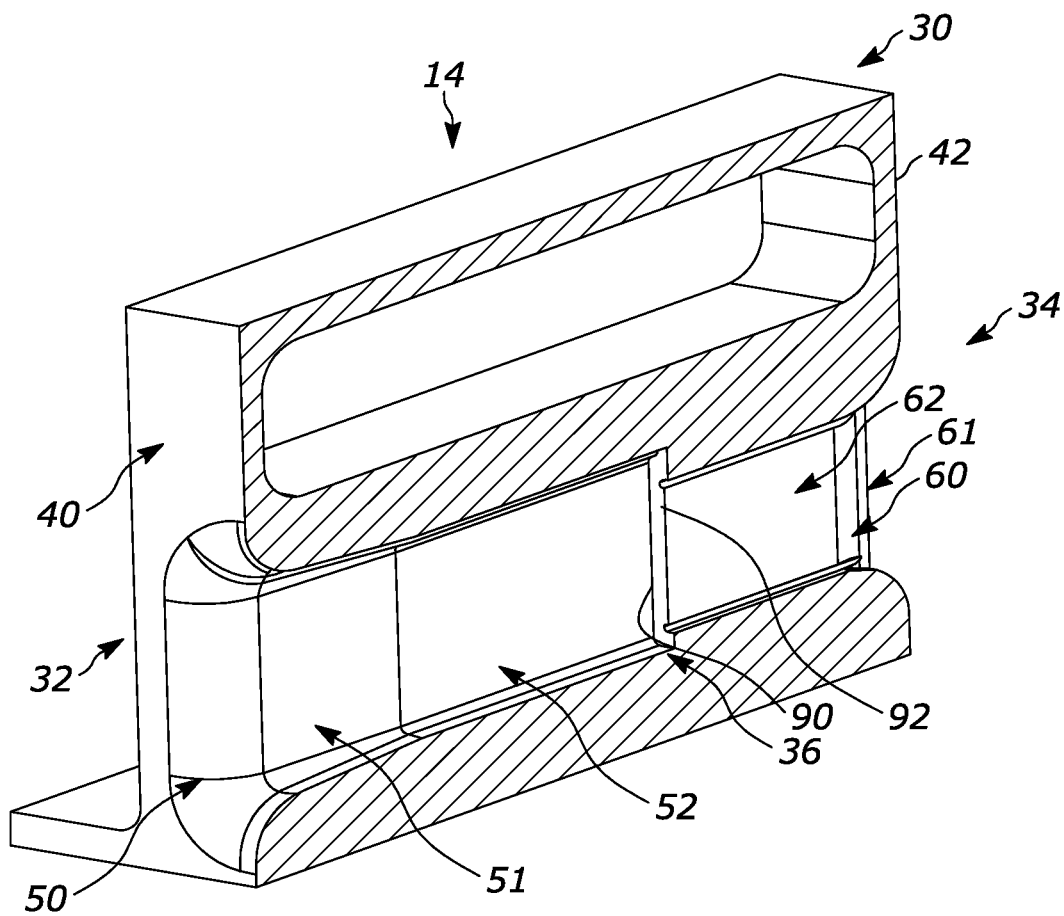
FIG. 13 of the drawings is a perspective cross-sectional view of the coupling guide block of the system of the present disclosure.
Figure 14:
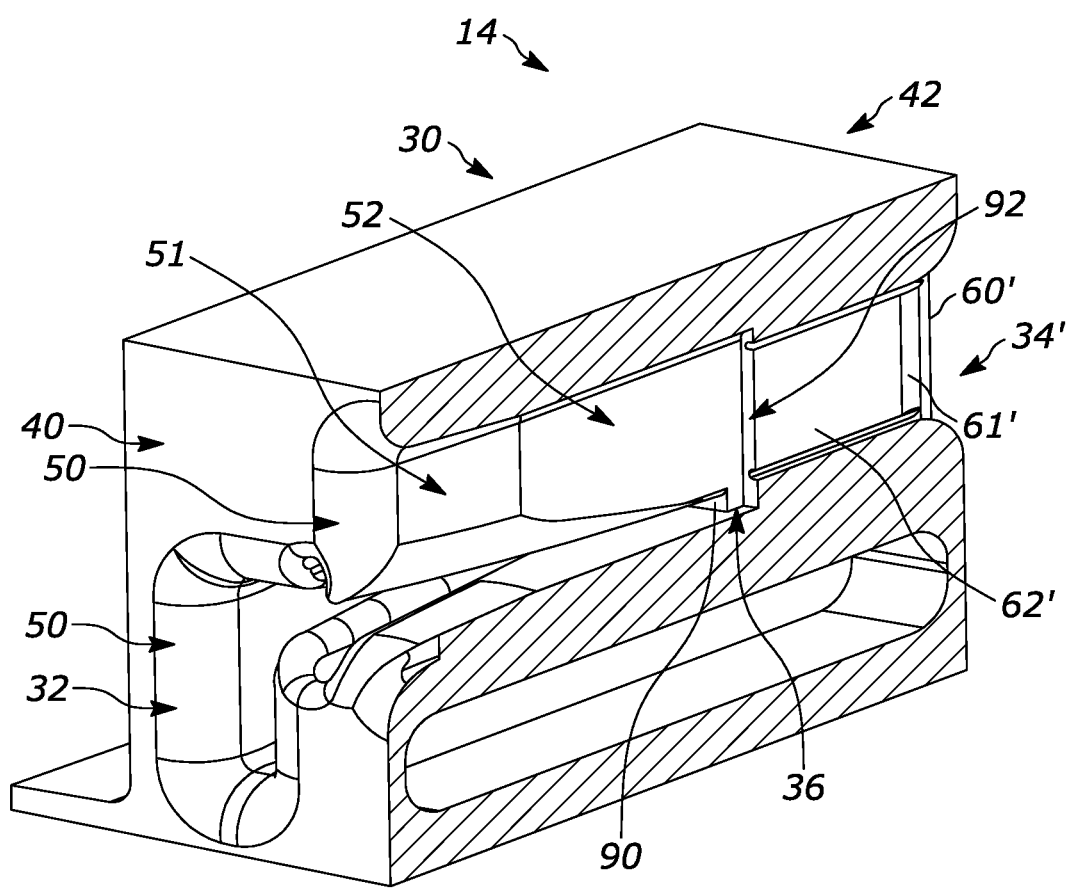
FIG. 14 of the drawings is a perspective cross-sectional view of the coupling guide block of the system of the present disclosure.
Figure 15:
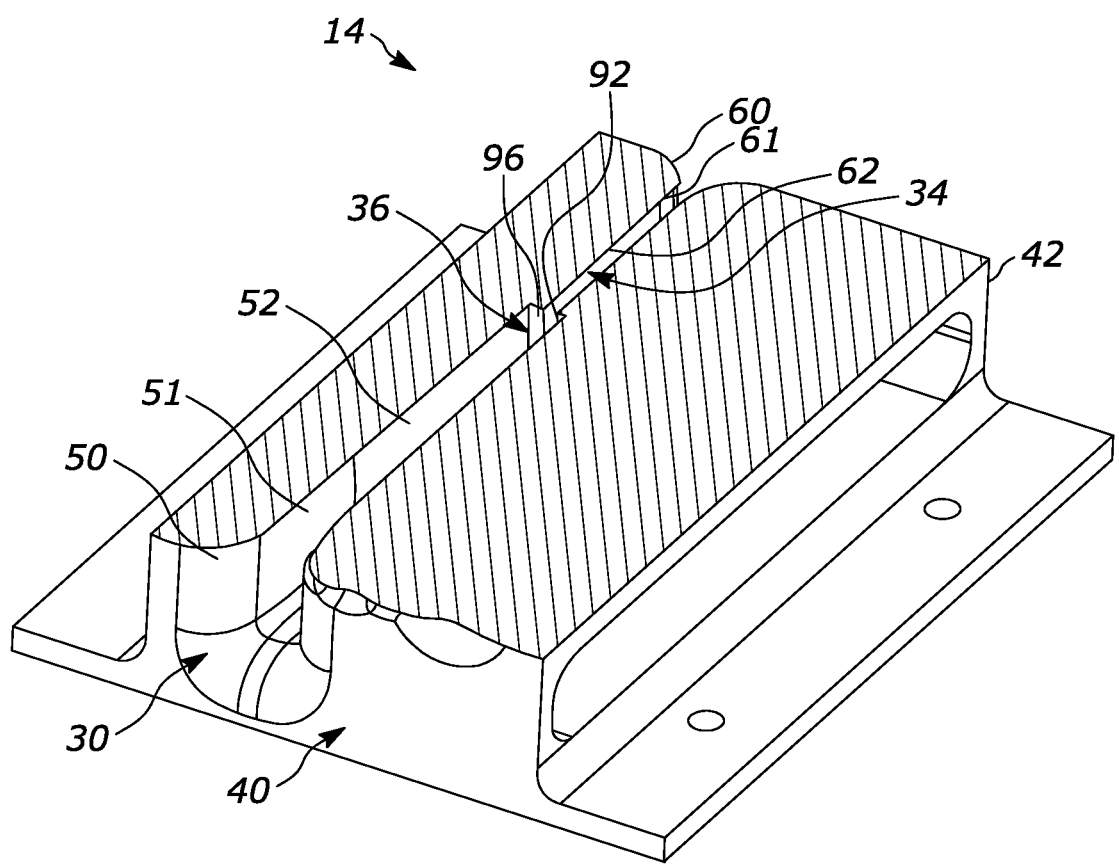
FIG. 15 of the drawings is a perspective cross-sectional view of the coupling guide block of the system of the present disclosure.
Figure 16:
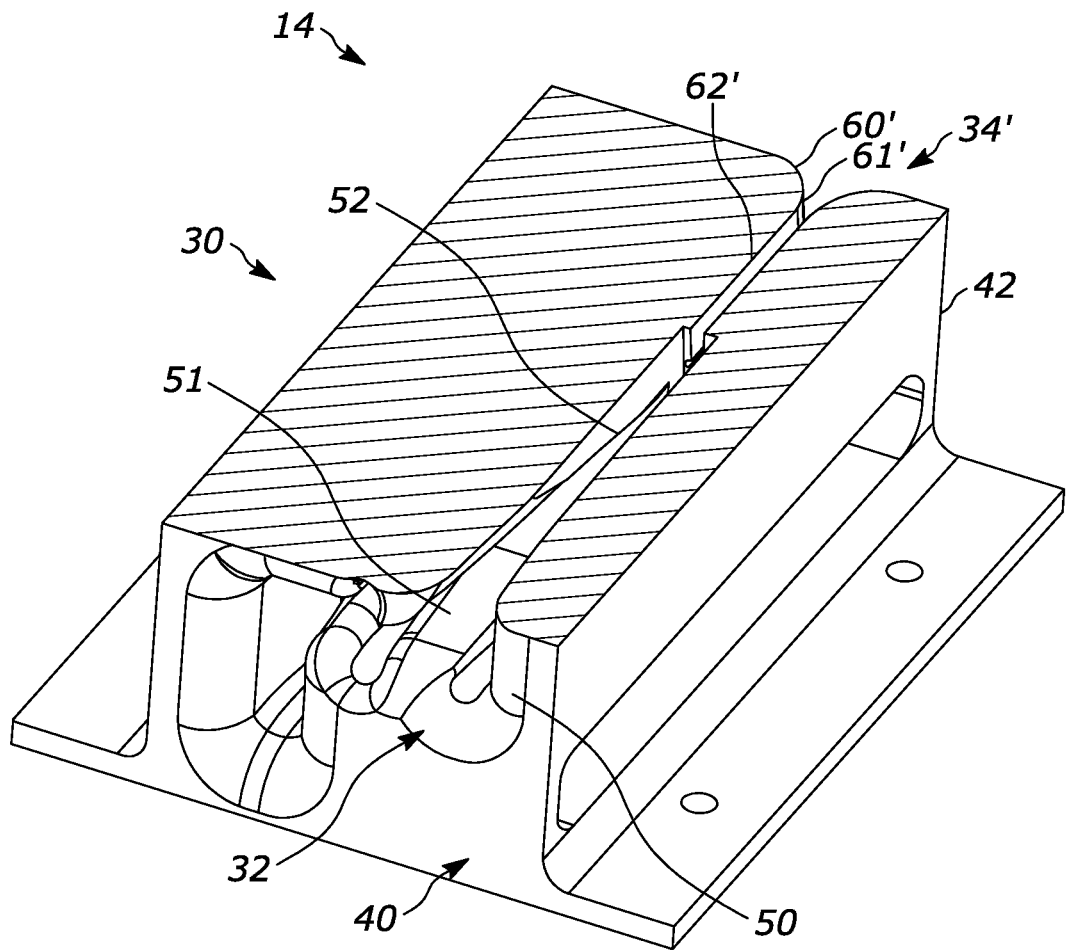
FIG. 16 of the drawings is a perspective cross-sectional view of the coupling guide block of the system of the present disclosure.
Figure 17:
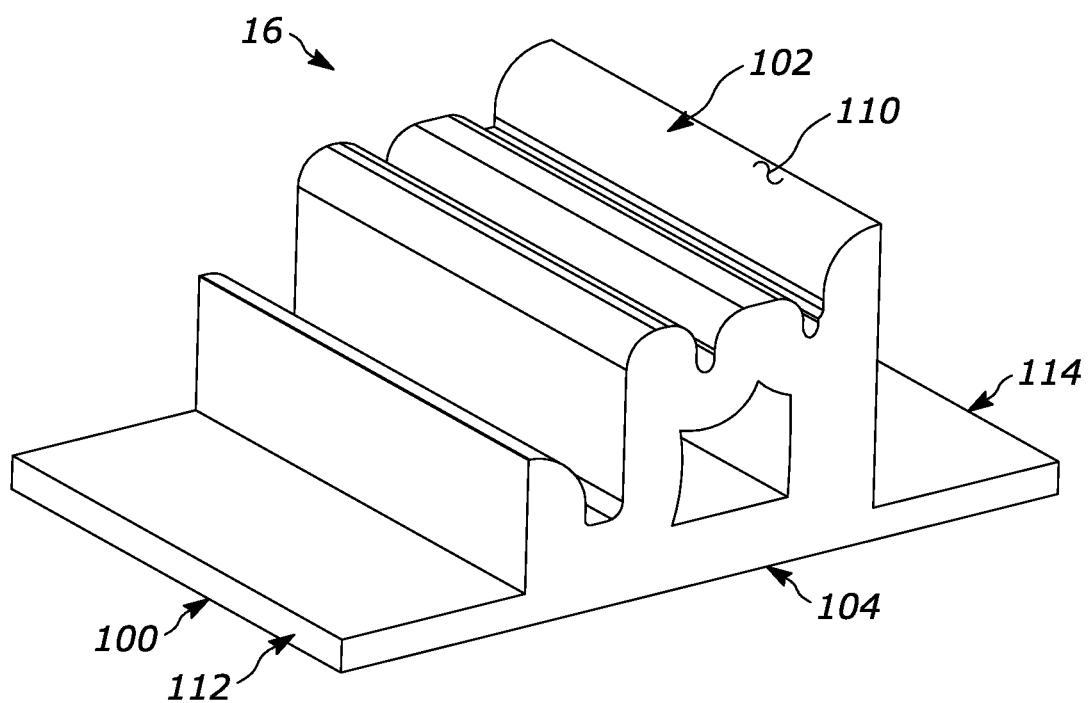
FIG. 17 of the drawings is a perspective view of the bracket support block of the system of the present disclosure.
Figure 18:
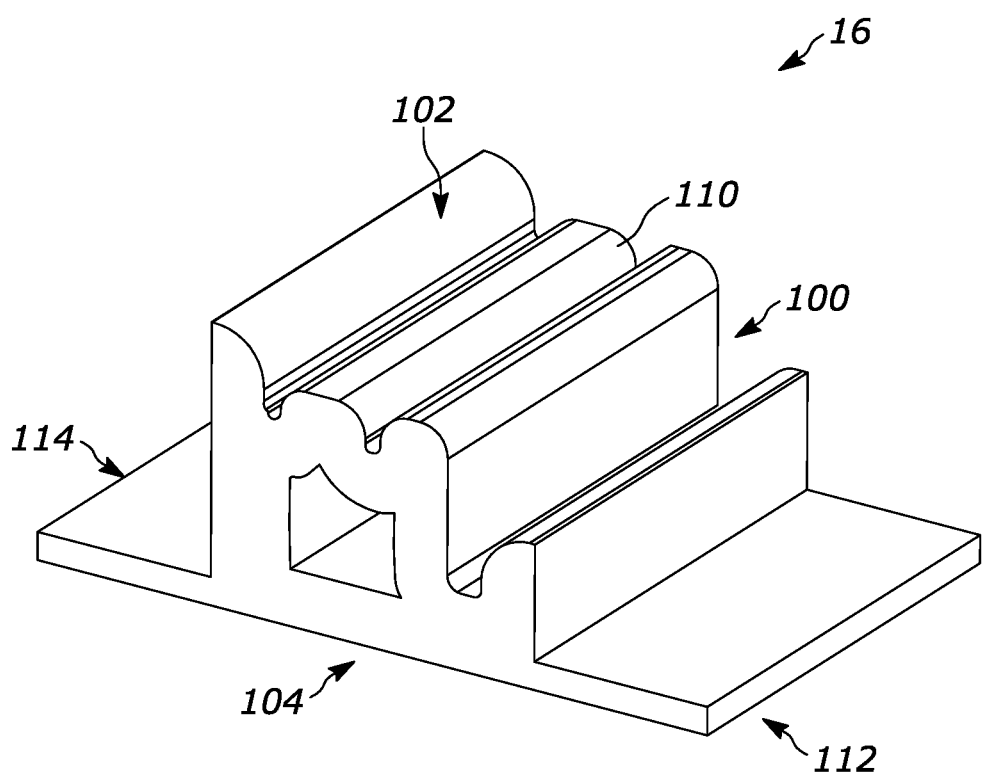
FIG. 18 of the drawings is a perspective view of the bracket support block of the system of the present disclosure.
Figure 19:
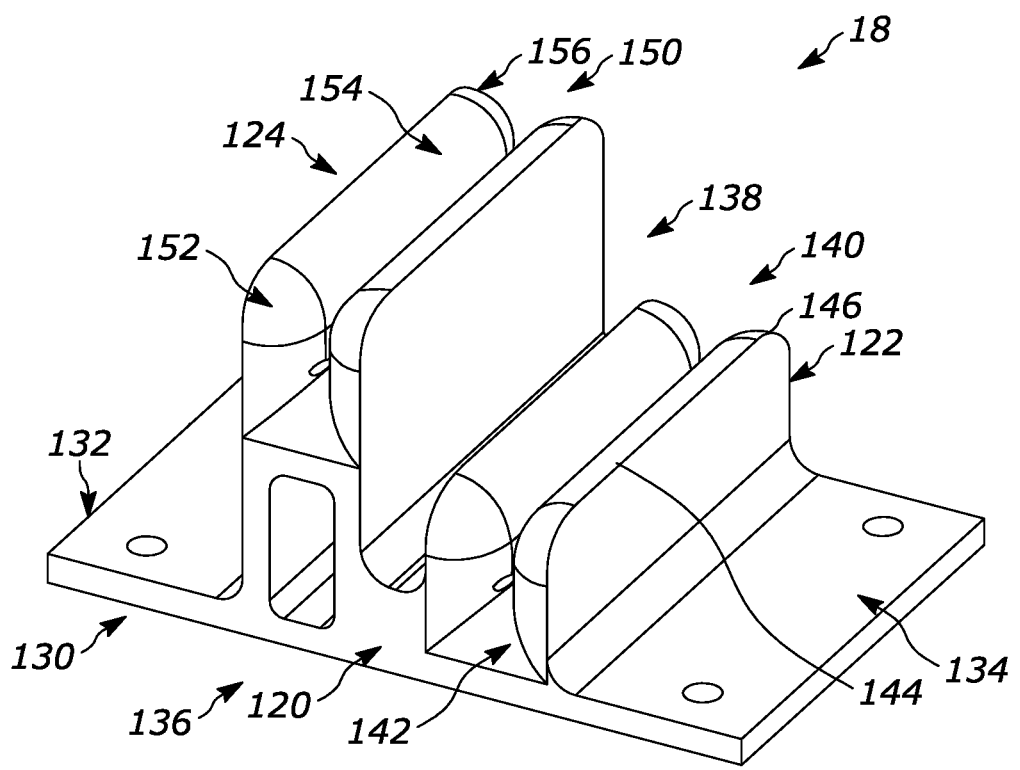
FIG. 19 of the drawings is a perspective view of the backer guide block of the system of the present disclosure.
Figure 20:
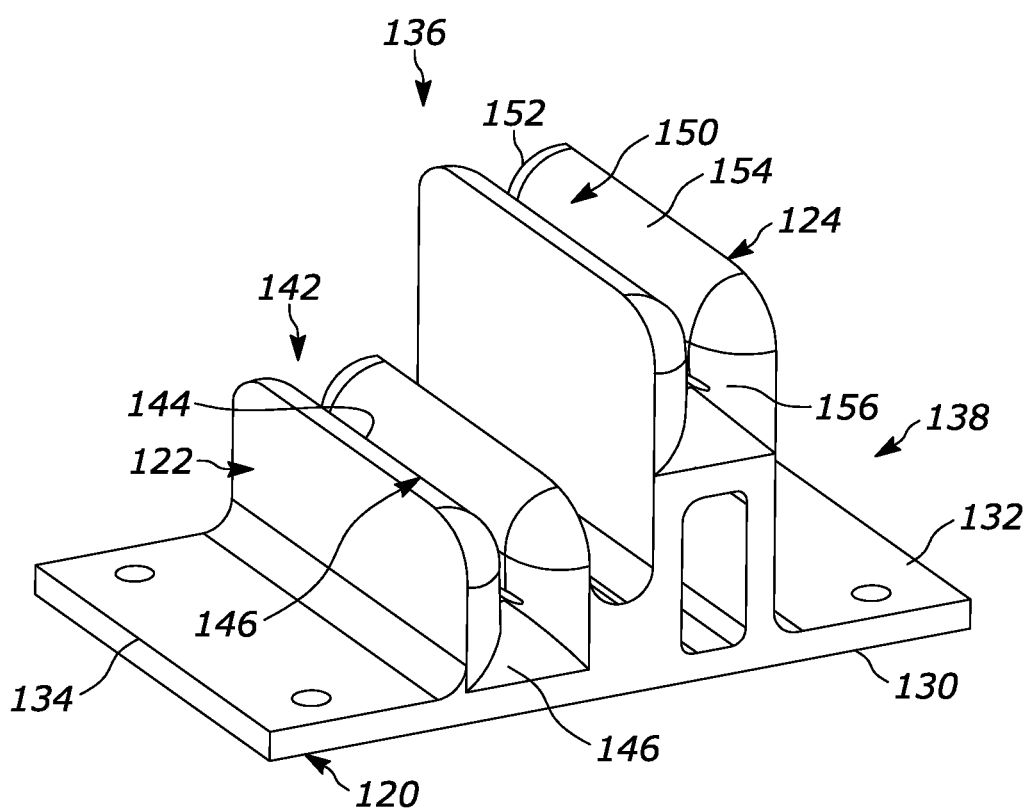
FIG. 20 of the drawings is a perspective view of the backer guide block of the system of the present disclosure.
Figure 21:
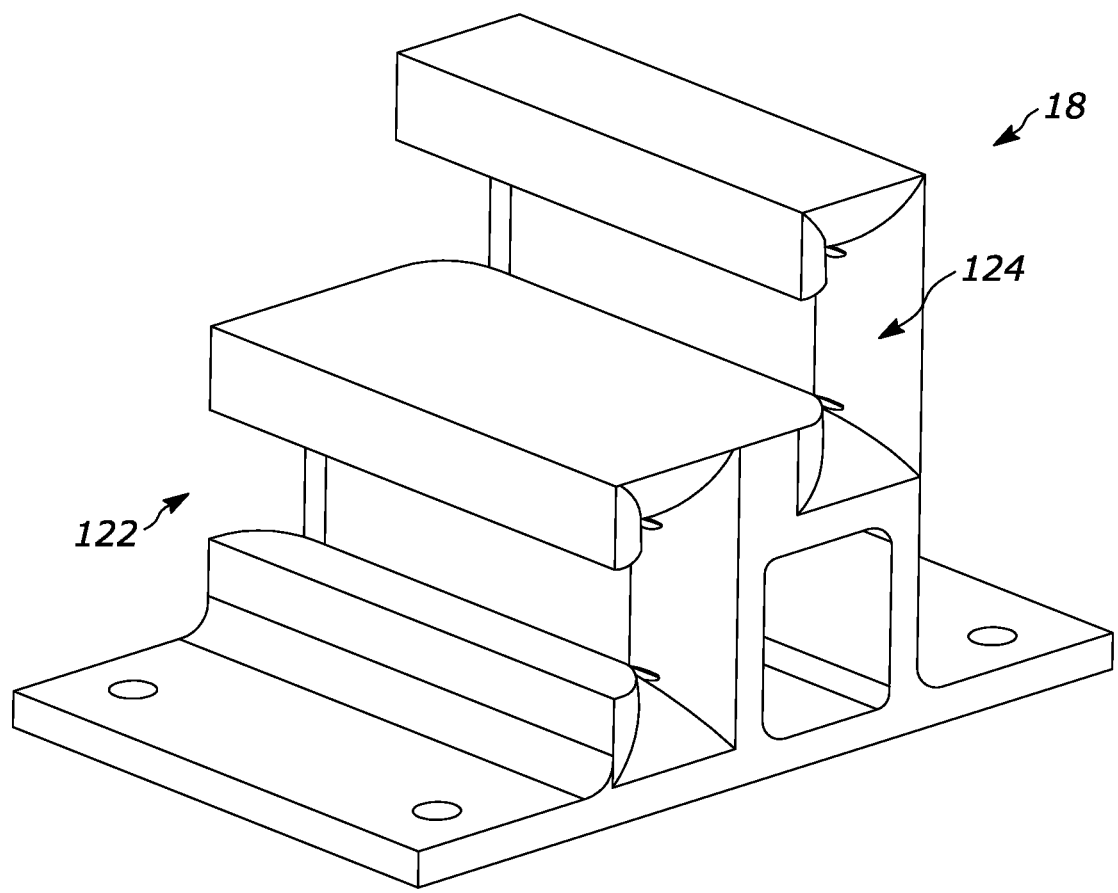
FIG. 21 of the drawings is a perspective view of another configuration of the backer guide block of the system of the present disclosure.
Figure 22:
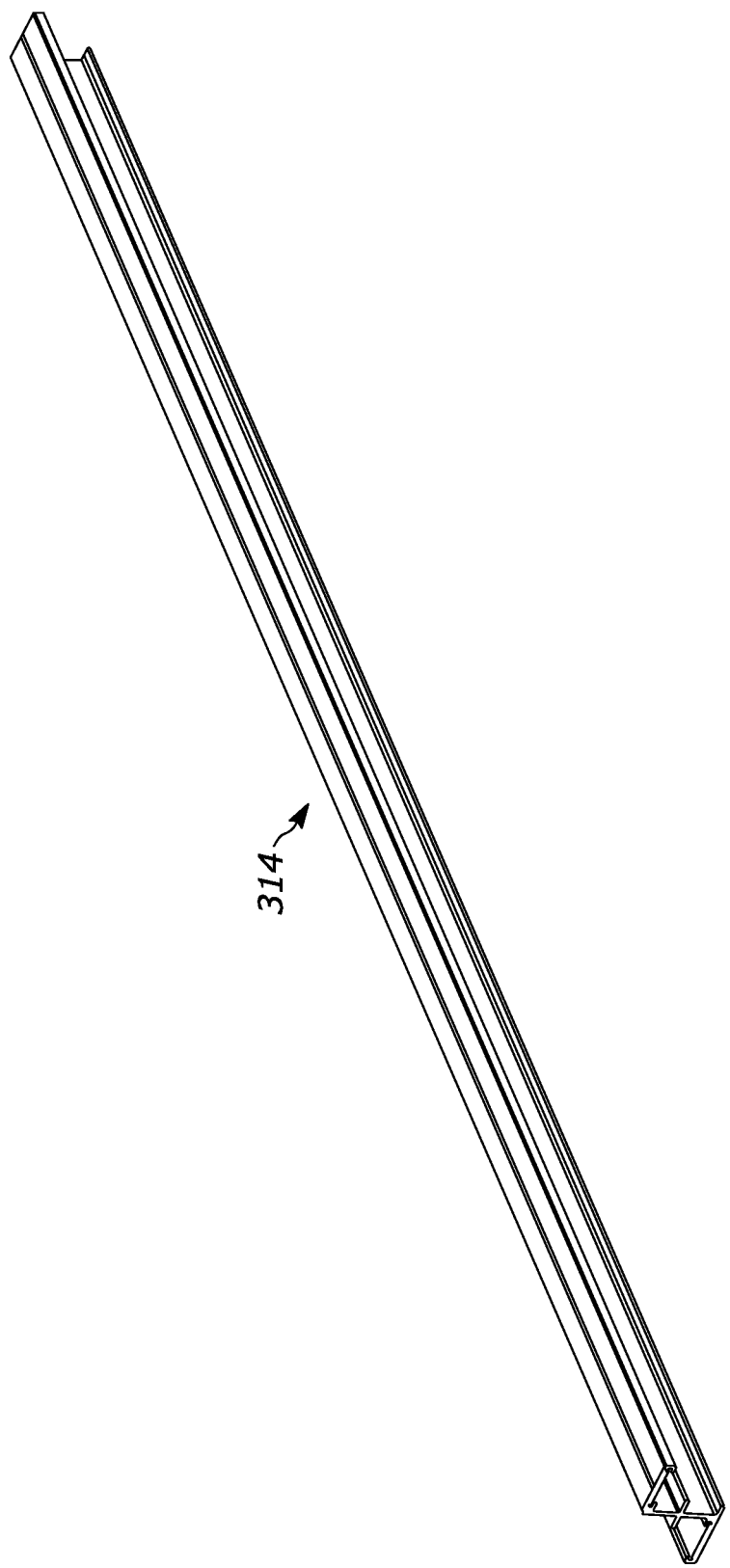
FIG. 22 of the drawings is a perspective view of a bracket member for use within the system of the present disclosure.
Figure 23:
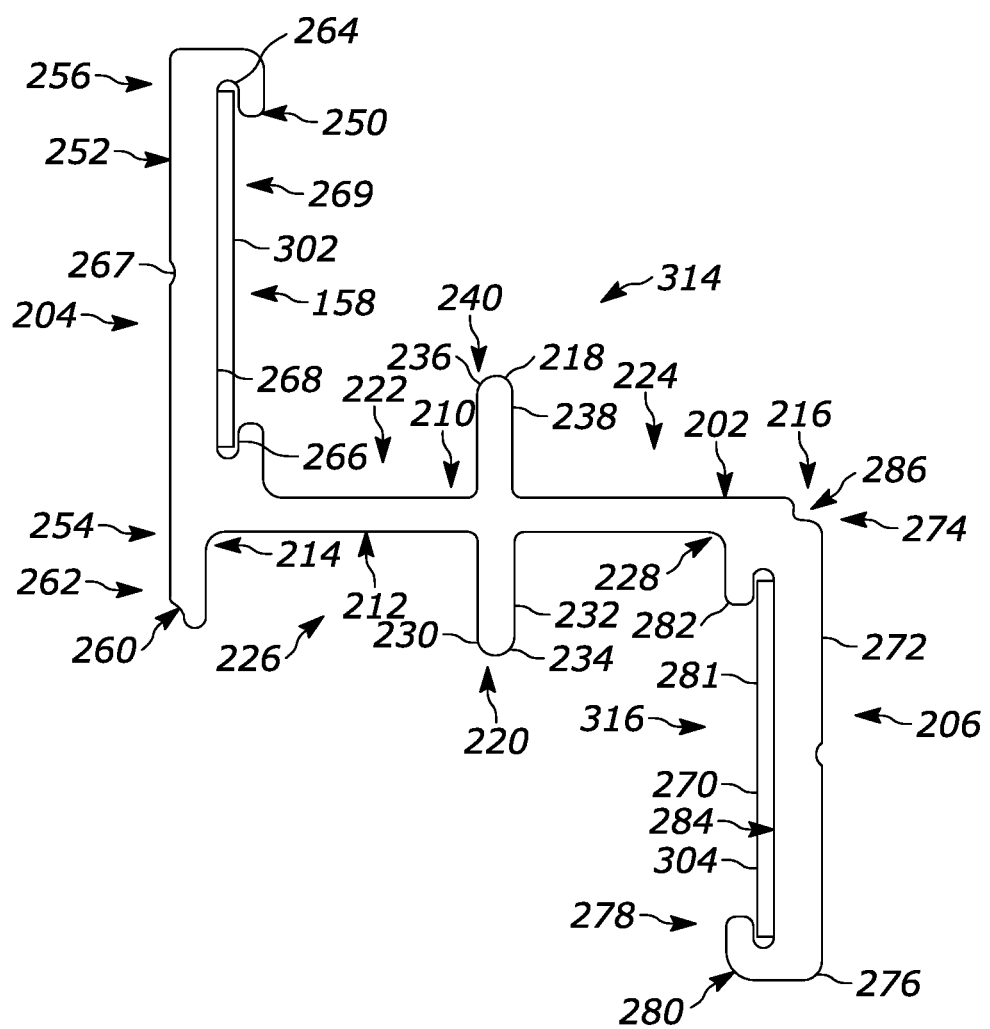
FIG. 23 of the drawings is a side elevational view of a bracket member having a pair of backers which is configured for use within the system of the present disclosure.
Figure 24:
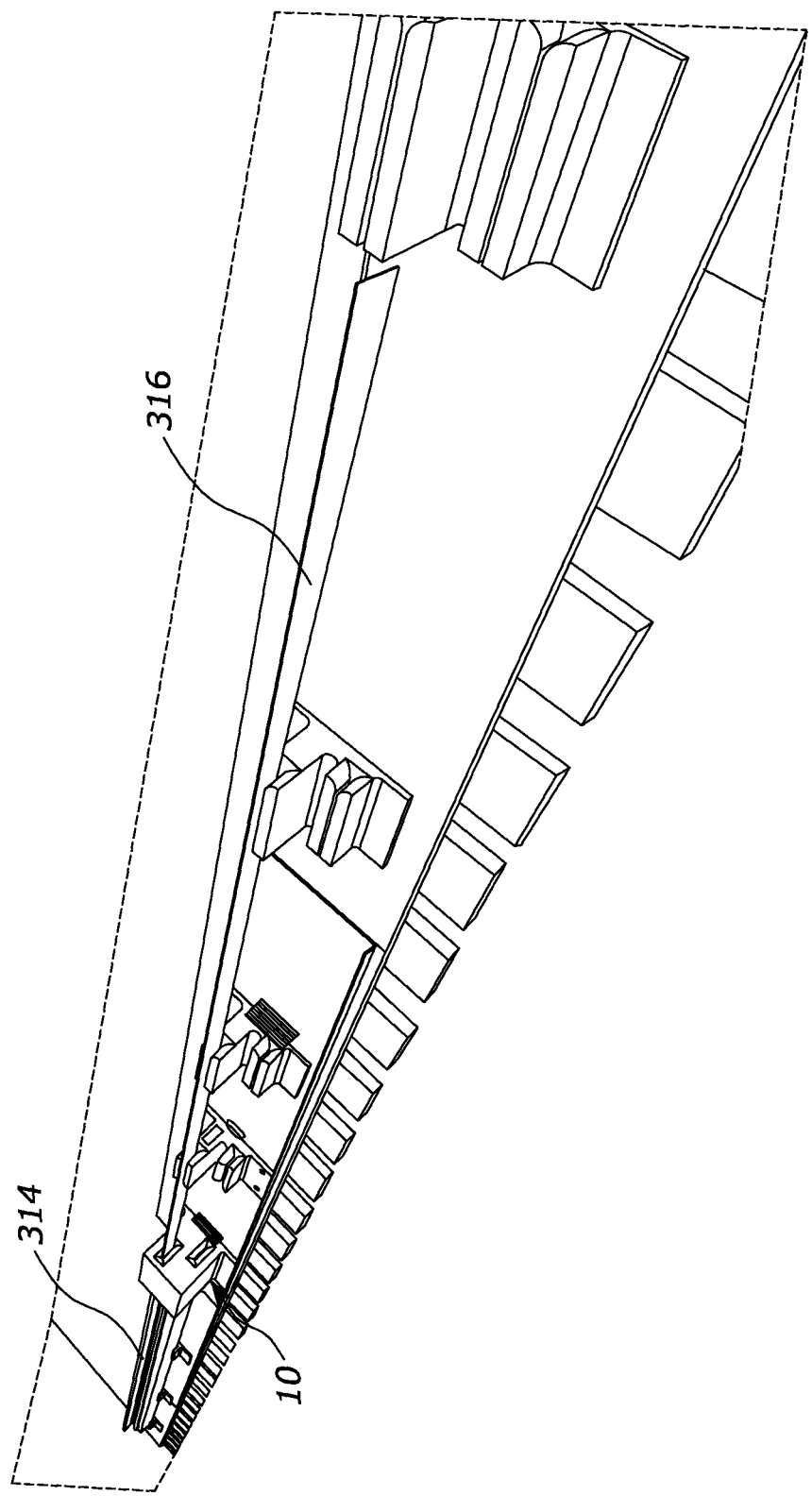
FIG. 24 of the drawings is a perspective view of the system in operation assembling a bracket member and a backer.
Figure 25:
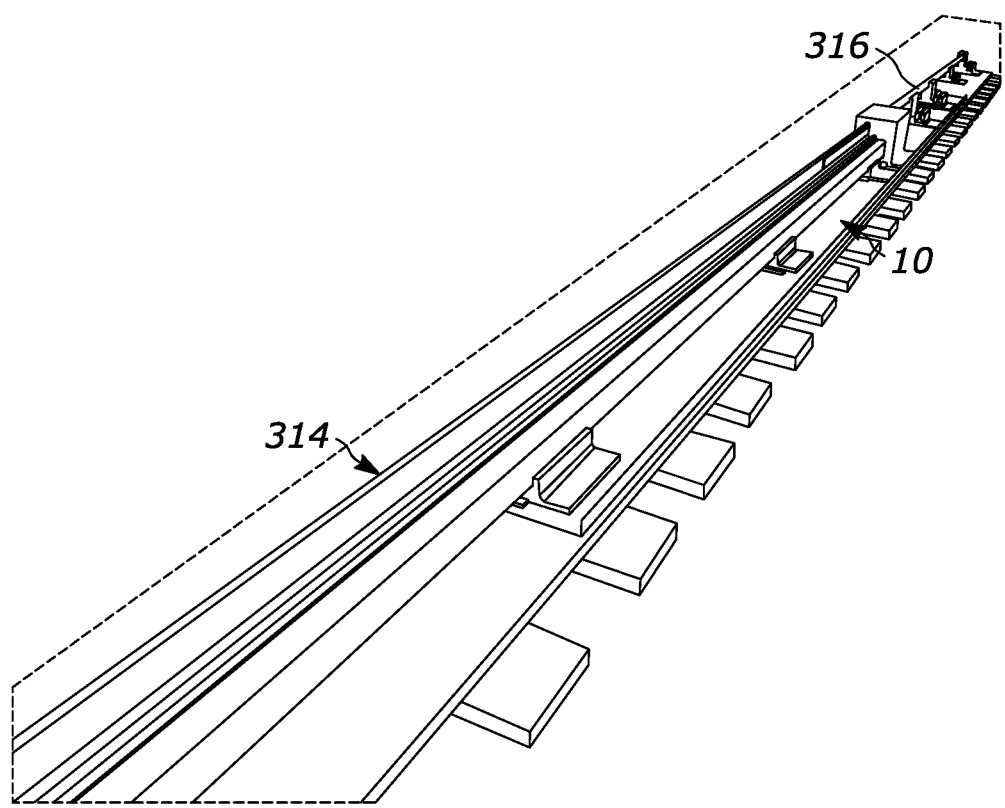
FIG. 25 of the drawings is a perspective view of the system in operation assembling a bracket member and a backer.

The second end wall 206 as shown in FIG. 2 is positioned at the second end of the body wall 202, and is oblique to, or, more preferably perpendicular to, the body wall 202 (and parallel to the first end wall 204). In the embodiment shown, the second end wall extends downwardly from the bottom surface 212 of the body wall 202.

The second end wall includes inside surface 270 and outside surface 272 which extend from inner end 274 (which is at the junction with the body wall 202), to outer end 276. A capillary break 286 having a configuration that matches the capillary break 260 of the first end wall 204.

A second reinforcement channel 278 is defined in one of the inside surface and the outside surface of the second end wall, and preferably on the inside surface thereof. The second reinforcement channel includes outer clip portion 280 and inner clip portion 282 which are spanned on one side by surface 284 and which define slot 281 on the other side thereof. The channel is generally parallel to the outside surface 272 of the second end wall, and generally extends the entirety of the inside surface below the lower surface 212 of the body wall 202.

As with the first end wall 204 above, second end wall strip 304 is slidably introduced into the second reinforcement channel 278, preferably, relatively snug therewithin. Preferably, the same materials are utilized for the second end wall strip 304 as with the first end wall strip 302.

The Assembling System

Referring again to the system 10 for assembling a bracket (i.e., a girt), the system comprises base 12, coupling guide block 14, bracket support block 16 and backer guide block 18. The base 12 comprises a surface (or a frame member) that has a first end 20, a second end 22 and a top surface 24. In the configuration shown, the base 12 comprises a sheet metal component positioned on a tabletop. In other configurations, a frame with discrete regions that can retain the various components is likewise contemplated. In still other configurations, a portable tabletop can be provided which can be collapsed and articulated as necessary. In still further configurations, the base can be an extension of the pultrusion machines, so that the system can be positioned at the end of the pultrusion machines for assembly after the formation of the girt. A number of other configurations are contemplated as well.

The coupling guide block 14 is shown as comprising a body 30, a bracket receiving bore 32, a backer receiving bore 34 and a mating region 36. The body 30 includes first end 40, second end 42, first side 44, second side 46, top end 48 and base 49. In the configuration shown, the body comprises a generally rectangular cubic configuration with the base 49 having opposing first flange 41 and second flange 43. It will be understood that the first and second flanges include openings through which fasteners can be extended for mating or attachment to the base 12.

The bracket receiving bore 32 extends from the first end 40 toward the second end 42. The bracket receiving bore 32 is defined into the body 30 and includes entry region 50, transition region 51, and end region 52. As will be understood the bore is configured to receive a similarly shaped bracket as the end region 52, while accepting the bracket at the larger entry region 50 and then guiding the bracket through the transition region into the end region 52 wherein the receiving bore 32 substantially matches the cross-sectional configuration of the bracket so as to retain the same in a desired orientation. As the bracket receiving bore mimics the shape of the bracket member, the bracket receiving bore 32 includes first end wall bore region 54, second end wall bore region 55, body wall bore region 56 and rib bore region 58. Those regions proximate the end region 52 substantially match the cross-sectional configuration of the bracket so as to be in relatively tight engagement and fixation.

The backer receiving bores 34, 34' extend from the second end 42 toward the first end 40. The backer receiving bore 34 will be described with the understanding that the backer receiving bore 34' is substantially identical in configuration shown. The backer receiving bore 34 includes entry region 60, transition region 61 and end region 62. The As with the bracket receiving bore, the backer receiving bore at the entry region 60 has a cross-sectional configuration that is larger than the backer member so as to receive the backer member even if not fully aligned. Through the transition region 61 and the end region 62 so that at the end region, the backer member is aligned properly and retained relatively tightly in the proper orientation for slidable attachment to the bracket. The backer bore 64 at the end region 62 includes a central channel 70, an upper transverse channel 72 and a lower transverse channel 74. The transverse channels 72, 74 provide for variations and imperfections at the upper and lower edges of the backer.

The mating region 36 essentially joins the bracket receiving bore 32 with the backer receiving bore 34, and includes bracket stop wall 90 and insert opening 92 which is a bore of a larger configuration than the backer bore 64 so as to provide a lead in and some flexibility of the backer to enter into the respective ones of the channels of the bracket.

In the configuration shown, the coupling guide block comprises a polymer, while other materials, including metals and alloys thereof, such as an aluminum alloy, are likewise contemplated, as are fiber reinforced polymers.

The bracket support block 16 is shown as comprising body 100 having an upper surface 102 and a base 104. A particular system may include a plurality of the bracket support blocks, which are substantially identical to bracket support block 16, and which are spaced apart from each other a predetermined distance. In the configuration shown, the bracket support block comprises an extruded polymer, metal or alloy thereof, or a fiber reinforced polymer. The upper surface 102 includes a profile 110 which substantially matches the outer profile of a portion of the bracket and is elevated to a height which aligns the bracket positioned thereon with the bracket receiving bore 32 of the coupling guide block 14.

The base 104 of the bracket support block 16 includes a first flange 112 and a second flange 114. The first and second flanges extend on opposing sides and may include openings which are configured to receive fasteners that affix the block to the base 12. Of course, other configurations of structures to retain or fix the bracket support blocks relative the coupling guide block are contemplated, including rail structures and the like.

The backer guide block 18 includes body 120, first insert guide member 122 and second insert guide member 124. The body 120 includes base 130 having first flange 132 and second flange 134, and first end 136 and second end 138. The first insert guide member 122 includes first channel 140. The first channel 140 includes entry region 142, transition region 144 and end region 146. The entry region is configured to receive the backer and to guide the backer through the transition region 144 to the end region 146, and is aligned with the backer receiving bore 34. The second insert guide member 124 includes second channel 150 defining entry region 152, transition region 154 and end region 156. The second channel is aligned with the backer receiving bore 34', with the second channel configured to guide the backer from the entry region to the end region 156 for insertion into the backer receiving bore.

The Assembly and the Method of Use of the System

For use, the components of the system for assembling a bracket are first assembled. Specifically, the coupling guide block 14 is provided and attached to base 12. Next, multiple bracket support blocks 16 are positioned to the first end side of the coupling slide block. The bracket support blocks 16 are aligned relative to each other and relative to the coupling guide block. It will be understood that an outermost one of the bracket support blocks may include a stop so as to fix the bracket and preclude movement of the bracket when positioned relative to the bracket receiving bore 32 of the coupling guide block 14. It is likewise contemplated that for some configurations, only one, or two bracket support blocks 16 may be utilized, whereas in other configurations, more than two bracket support blocks may be utilized. In still other configurations, the bracket support block may be omitted, and these may be manually inserted and held.

Similarly, a plurality of backer guide blocks 18 may be positioned on the second end side of the coupling guide block 14. The backer guide blocks 18 can be configured so as to be spaced apart from each other and aligned with the backer receiving bores 34, 34'. In the configuration shown, a plurality of the backer guide blocks are supplied. In other configurations, a single backer guide block or two may be provided. In still other configurations, the bakers may be held manually and inserted manually into the backer receiving bores 34, 34'.

In operation, the user can position the bracket 314 onto the upper surface 102 of the bracket support blocks 16 so that the profile of the bracket matches the profile 110 of the upper surface. Once positioned, the user can direct the bracket 314 into the bracket receiving bore 32 of the coupling guide block 14. As it is received, the in the bracket receiving bore, initially, the bracket enters into the entry region 50. If the bracket is not fully aligned, the entry region and the transition region 51 urge the bracket into the desired orientation within the coupling guide block. Eventually, the block reaches the end region, and the bracket stop wall 90, thereby precluding further insertion. At this stage, the bracket is ready to receive the backers.

On the opposite side of the coupling guide block 14, a first bracket is positioned within the first insert guide members 122 of the plurality of backer guide blocks 18. The backer may be sequentially slidably inserted into each of the backer guide blocks, or they may be inserted from above (in the configuration shown). The backer can then be slid toward the backer receiving bore 34 at which time, eventually, the backer enters into the bore at the entry region 60. Continued insertion will direct the backer receiving bore to the mating region 36. If the backer is misaligned, then the entry region and the transition region will urge the backer into the correct alignment as it is received by the end region 62.

Similarly, a second backer may be positioned on the second insert guide members 124 of the plurality of backer guide blocks 18. As with the first backer, the second backer can be directed into the backer receiving bore 34' with the entry region 60' and the transition region 61' urging the backer into the proper alignment for receipt by the end region 62'. The insertion can continue until the backer reaches the mating region 36.

Once aligned and inserted, the backer members can be further inserted into the coupling guide block 14 and as they are inserted, they align with the respective channels that are to receive the backers in the bracket. As the backer members are further inserted, eventually, the entirety (or substantially the entirety) of the backer members are fully inserted into the corresponding channel of the bracket, and the bracket assembly (i.e., girt) is fully assembled.

In the configuration shown, the insertion process occurs manually. That is, the user directs the backer members into the coupling guide block for coupling. In other configurations, the insertion of the backer into the coupling guide block (and, in turn, the bracket) may be automated. This may be achieved by a pair of friction wheels rotating in opposite directions that can grasp opposing sides of each of the backers and direct them in a insertion direction. Such a pair of friction wheels can be positioned proximate the coupling guide block, on a second side thereof, or within the coupling guide block itself so that the friction wheels can be in communication with the backer receiving bores 34, 34' between the entry region and the end region thereof.

In other configurations, the backer members may be inserted through a linear actuator which is coupled to each of the backer members, and which can linearly translate the backers toward the coupling guide block for insertion into the bracket. Other variations as to the assembly are contemplated.

Advantageously, the system provides for an effective and relatively simple manner to expeditiously assembly backers into brackets. It will be understood that the brackets may have an number of different configurations, and that any number of backers may be utilized (i.e., there may be less than 2 or in excess of 2 backers for a bracket). The backers may additionally comprise a single backer or a plurality of backers that are positioned in an end to end configuration within a respective channel. Furthermore, it is contemplated that the backer may be formed from a material other than a steel, or stainless steel member, such as a polymer, a composite, another metal or alloy thereof among others.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A coupling guide block attachable to a base, the coupling guide block comprising:
    a body having a first end and a second end;
    a bracket receiving bore having an entry region at the first end of the body and extending toward the second end of the body, the bracket receiving bore structurally configured to receive an end of a bracket member therewithin; and
    a backer receiving bore having an entry region at the second end of the body and extending toward the first end of the body, the backer receiving bore meeting the bracket receiving bore between the first end and the second end of the body at a mating region, the backer receiving bore having at least one backer bore region configured to receive an end of a backer that is slidably attachable to the bracket member;
    wherein the maintaining of the bracket within the bracket receiving bore while inserting the backer into the backer receiving bore directs the bracket into slidable engagement with the bracket member.

2. The coupling guide block of claim 1 wherein the backer receiving bore includes a first backer bore region and a second backer bore region that is spaced apart from the first backer bore region, the first backer bore region structurally configured to receive a first backer therewithin for slidable coupling with the bracket and the second backer bore region structurally configured to receive a second backer therewithin for slidable coupling with the bracket.

3. The coupling guide block of claim 1 wherein the mating region includes a bracket stop wall corresponding to the bracket receiving bore and an insert opening corresponding to the backer receiving bore, the bracket stop wall precluding further insertion of the bracket into the body of the coupling guide block, and the insert opening configured to align with a portion of the bracket structurally configured to receive the backer.

4. The coupling guide block of claim 1 wherein the first end and the second end are substantially parallel to each other.

5. The coupling guide block of claim 1 further including a first flange extending from a first side of the body and a second flange extending from a second side of the body, the first and second flanges positioned proximate a base of the body so as to overly the base.

6. The coupling guide block of claim 5 wherein each of the first flange and the second flange include a plurality of openings, structurally configured to receive a fastener therethrough.

7. The coupling guide block of claim 5 wherein the first flange and the second flange span between the first end and the second end of the body and are substantially perpendicular to each of the first end and the second end.

8. The coupling guide block of claim 1 wherein the backer receiving bore includes an entry region that inwardly tapers to a transition region that further inwardly tapers to an end region.

9. The coupling guide block of claim 8 wherein, at the end region, the backer receiving bore includes a central channel having an upper transverse channel and a lower transverse channel opposite the upper transverse channel, the upper and lower transverse channels being substantially perpendicular to the central channel therebetween.

10. A system for assembling a bracket comprising:
    the coupling guide block of claim 1;
    at least one bracket support block positioned in a spaced apart orientation from the first end of the coupling guide block, each of the at least one bracket support blocks comprising a body with an upper surface defining a profile, the profile substantially corresponding to at least a portion of the bracket positionable thereon, the profile aligning with the bracket receiving bore of the coupling guide block; and
    at least one backer guide block positioned in a spaced apart orientation from the second end of the coupling guide block, each of the at least one backer guide block comprising a body having at least one insert guide member defining a channel to receive the backer member therealong, the channel aligning with the backer receiving bore of the coupling guide block.

11. The system of claim 10 wherein the at least one insert guide member comprises a first insert guide member and a second insert guide member, the backer receiving bore including a first backer bore region and a second backer bore region, the first insert guide member defining a first channel that is aligned with the first backer bore region and the second insert guide member defining a second channel that is aligned with the second backer bore region.

12. The system of claim 10 wherein the at least one bracket support block comprises at least three backer bore support blocks positioned in an aligned and spaced apart orientation.

13. The system of claim 12 wherein the at least one backer guide block comprises at least three backer guide blocks positioned in an aligned and spaced apart orientation.

14. The system of claim 10 wherein the backer is one of manually directed and directed through automation along the at least one backer support block and through the coupling guide block into the slidable engagement with the bracket.

15. The system of claim 10 wherein the at least one channel of the backer guide block is configured in one of a "U" shaped configuration and a "C" shaped configuration.

16. A method of assembling a bracket with a backer comprising the steps of:
   providing a system of claim 10;
   providing a bracket member;
   providing a backer member;
   placing the bracket member on the at least one bracket support block;
   slidably directing the bracket member into the bracket receiving bore of the coupling guide block;
   placing the backer member in the at least one channel of the at least one backer block;
   slidably directing the backer member into the backer receiving bore of the coupling guide block; and
   continuing to slide the backer member through the receiving bore and into slidable engagement with the bracket, while maintaining the bracket within the bracket receiving bore.

17. The method of claim 16 wherein the step of slidably directing the bracket member further comprises the step of slidably directing the bracket member until the bracket member reaches the mating region.

18. The method of claim 16 further comprising the steps of:
   providing a second backer member;
   placing the backer member in a second channel of the at least one backer block;
   slidably directing the second backer member into a second backer receiving bore region of the coupling guide block; and
   continuing to slide the second backer member through the second backer receiving bore region of the coupling guide block and into slidable engagement with the bracket, while maintaining the bracket within the bracket receiving bore.

19. The method of claim 18 wherein the step of continuing to slide the backer member and the step of continuing to slide the second bracket member occur simultaneously.

20. The method of claim 16 wherein the step of continuing to slide can occur manually or through automation.

* * * * *